US008913261B2

(12) United States Patent
Yasui

(10) Patent No.: US 8,913,261 B2
(45) Date of Patent: Dec. 16, 2014

(54) METHOD FOR CONTROLLING ADVERTISEMENT-ATTACHED COPYING

(71) Applicant: Toru Yasui, Osaka (JP)

(72) Inventor: Toru Yasui, Osaka (JP)

(73) Assignee: KYOCERA Document Solutions Inc. (JP)

( * ) Notice: Subject to any disclaimer, the term of this patent is extended or adjusted under 35 U.S.C. 154(b) by 86 days.

(21) Appl. No.: 13/679,867

(22) Filed: Nov. 16, 2012

(65) Prior Publication Data

US 2013/0128297 A1     May 23, 2013

(30) Foreign Application Priority Data

Nov. 17, 2011   (JP) ................. 2011-251778

(51) Int. Cl.
*G06K 15/02*    (2006.01)
*H04N 1/00*     (2006.01)

(52) U.S. Cl.
CPC . *G06K 15/02* (2013.01); *H04N 1/00* (2013.01)
USPC ........................................ 358/1.13; 358/1.15

(58) Field of Classification Search
CPC ... G06Q 30/02; G06Q 30/0241; G06K 15/02; G06F 17/42; G09F 23/06; G09F 7/18; H04N 1/00
USPC ................................. 358/1.13, 1.1
See application file for complete search history.

(56) References Cited

U.S. PATENT DOCUMENTS

| 5,816,716 A * | 10/1998 | Sugiyama ................ 400/76 |
| 6,891,636 B1 * | 5/2005 | Kawai et al. ............. 358/1.18 |
| 2002/0196452 A1 * | 12/2002 | Komiya ................... 358/1.1 |

FOREIGN PATENT DOCUMENTS

| JP | 2000-347533 A | 12/2000 |
| JP | 2004-069720 | 3/2004 |
| JP | 2007-266884 A | 10/2007 |

* cited by examiner

*Primary Examiner* — King Poon
*Assistant Examiner* — Iriana Cruz
(74) *Attorney, Agent, or Firm* — McDonnell Boehnen Hulbert & Berghoff LLP

(57) ABSTRACT

An image forming apparatus includes following components. A printing device prints on a recording medium. A reading device reads an image from an original document. An advertisement storage unit stores an advertisement. An advertisement-printed medium holding unit holds an advertisement-printed medium. An advertisement-printable medium holding unit holds an advertisement-printable medium. A copy control unit controls copying and enables the printing device to print the image on the recording medium. The copy control unit performs, in response to an instruction for advertisement-attached copying, one of the following: i) advertisement-printable medium copying in which the stored advertisement is printed on the advertisement-printable medium, and ii) advertisement-printed medium copying in which the advertisement-printed medium is used if a specific condition is satisfied.

17 Claims, 21 Drawing Sheets

46 BOX STATE INFORMATION

| BOX ID | STATE OF BOX |
|--------|--------------|
| 1 | USABLE |
| 2 | WRITING |

46 BOX STATE INFORMATION

| BOX ID | STATE OF BOX |
|---|---|
| 1 | USABLE |
| 2 | WRITING |

FIG. 5

71 ADVERTISEMENT DATA FOLDER

| BOX ID | DATA |
| --- | --- |
| 1 | A3 COLOR ADVERTISEMENT DATA |
| 1 | A3 MONOCHROME ADVERTISEMENT DATA |
| 1 | A4 COLOR ADVERTISEMENT DATA |
| 1 | A4 MONOCHROME ADVERTISEMENT DATA |
| 2 | A3 COLOR ADVERTISEMENT DATA |
| 2 | A3 MONOCHROME ADVERTISEMENT DATA |
| 2 | A4 COLOR ADVERTISEMENT DATA |
| 2 | A4 MONOCHROME ADVERTISEMENT DATA |

FIG. 7

METHOD FOR CONTROLLING ADVERTISEMENT-ATTACHED COPYING

REFERENCE TO RELATED APPLICATIONS

This application is based upon and claims the benefit of priority from the corresponding Japanese Patent Application No. 2011-251778, filed in the Japan Patent Office on Nov. 17, 2011, the entire contents of which are incorporated herein by reference.

BACKGROUND

1. Technical Field

The present disclosure relates to a method for controlling advertisement-attached copying. Further, some methods may relate to reading an image from an original document and printing the image. Unless otherwise indicated herein, the description in this section is not prior art to the claims in this application and is not admitted to be prior art by inclusion in this section.

2. Description of the Related Art

When performing advertisement-attached copying, typical image forming apparatuses may print an advertisement stored in memory. Some image forming apparatuses may use original document data with the advertisement when printing on the same surface of a printing medium. As such, the printing medium may be conveyed from a holding unit.

In some cases involving copying, printing may be performed on a plurality of printing media. In such cases, typical image forming apparatuses may print the same advertisement on all the printing media.

SUMMARY

According to an example embodiment of the present disclosure, an image forming apparatus includes a printing device, a reading device, an advertisement-printed medium holding unit, an advertisement-printable medium holding unit, an advertisement storage unit, and a copy control unit. The printing device is configured to print on a recording medium. The reading device is configured to read an image from an original document. The advertisement-printed medium holding unit is configured to hold an advertisement-printed medium. The advertisement-printable medium holding unit is configured to hold an advertisement-printable medium. The advertisement storage unit is configured to store an advertisement. The copy control unit is configured to control copying. Controlling copying enables the printing device to print the image on the recording medium. The copy control unit is further configured to perform, in response to an instruction for advertisement-attached copying, one of the following: i) advertisement-printable medium copying, wherein the advertisement is printed on the advertisement-printable medium, and ii) advertisement-printed medium copying, wherein the advertisement-printed medium is used if the instruction satisfy a specific condition for printing on a plurality of recording media.

According to another example embodiment of the present disclosure, a non-transitory computer-readable recording medium stores a copy control program to be executed by a computer in an image forming apparatus. The copy control program includes five program codes. The first program code causes the computer to print on a recording medium. The second program code causes the computer to read an image from an original document. The third program code causes the computer to store an advertisement. The fourth program code causes the computer to control copying for printing on the recording medium. The fifth program code causes the computer to perform, in response to an instruction for advertisement-attached copying, one of the following: i) advertisement-printable medium copying, wherein the advertisement is printed on an advertisement-printable medium, and ii) advertisement-printed medium copying, wherein an advertisement-printed medium is used if the instructed copying satisfies a specific condition for printing on a plurality of recording media.

According to still another example embodiment of the present disclosure, a copy control method includes: 1) printing, via a printing device, on a recording medium; 2) reading, via a reading device, an image from an original document; 3) storing, via an advertisement storage unit, an advertisement; 4) controlling, via a copy control unit, copying to enable the printing device to print the image on the recording medium; and 5) performing, via the copy control unit, in response to an instruction for advertisement-attached copying, one of the following: i) advertisement-printable medium copying, wherein the advertisement is printed on an advertisement-printable medium, and ii) advertisement-printed medium copying, wherein an advertisement-printed medium is used if the instructed copying satisfies a specific condition for printing on a plurality of recording media.

Additional features and advantages are described herein, and will be apparent from the following Detailed Description and the figures.

BRIEF DESCRIPTION OF THE DRAWINGS

In the accompanying drawings:

FIG. 5 illustrates an example of box state information, possibly as illustrated in FIG. 2;

FIG. 7 illustrates an example of contents of an advertisement data folder;

DETAILED DESCRIPTION

Referring to the accompanying drawings, embodiments of the present disclosure will be described below.
(First Embodiment)

A description will first be given of the configuration of a network system according to a first embodiment of the present disclosure.

Figure 1:
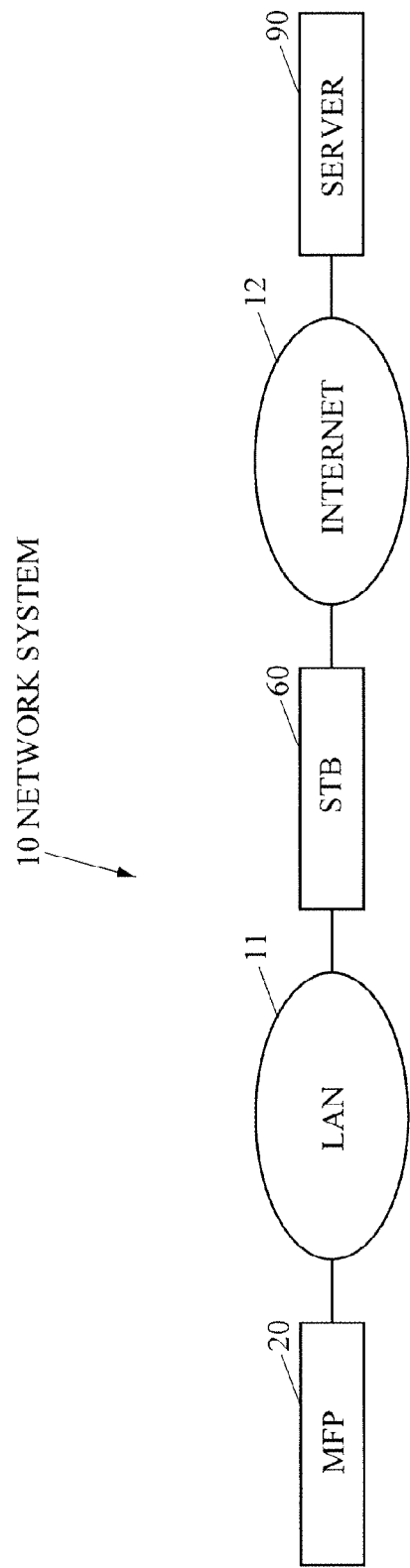
FIG. 1 illustrates a block diagram of a network system, according to example embodiments of the present disclosure.

FIG. 1 illustrates a block diagram of a network system, according to example embodiments of the present disclosure.

As illustrated in FIG. 1, network system 10 includes multifunction peripheral (MFP) 20 serving as an image forming apparatus, local area network (LAN) 11, set-top box (STB) 60 capable of communicating with MFP 20 via LAN 11, Internet 12, and server 90 capable of communicating with STB 60 via Internet 12.

MFP 20 may be installed in various public places, such as a university or convenience store, for example. In such public places, MFP 20 can be used by people who are targeted by advertisements (hereinafter, these people may be referred to as "advertisement targets").

STB 60 manages advertisements that are used by MFP 20 to perform advertisement-attached copying.

Server 90 may host services for users of various computers, for example, a personal computer (PC). Server 90 may be also be installed in various places, such as an advertising agency, where server 90 can be operated by people who distribute advertisements (hereinafter, these people are referred to as "advertisement distributors").

Figure 2:
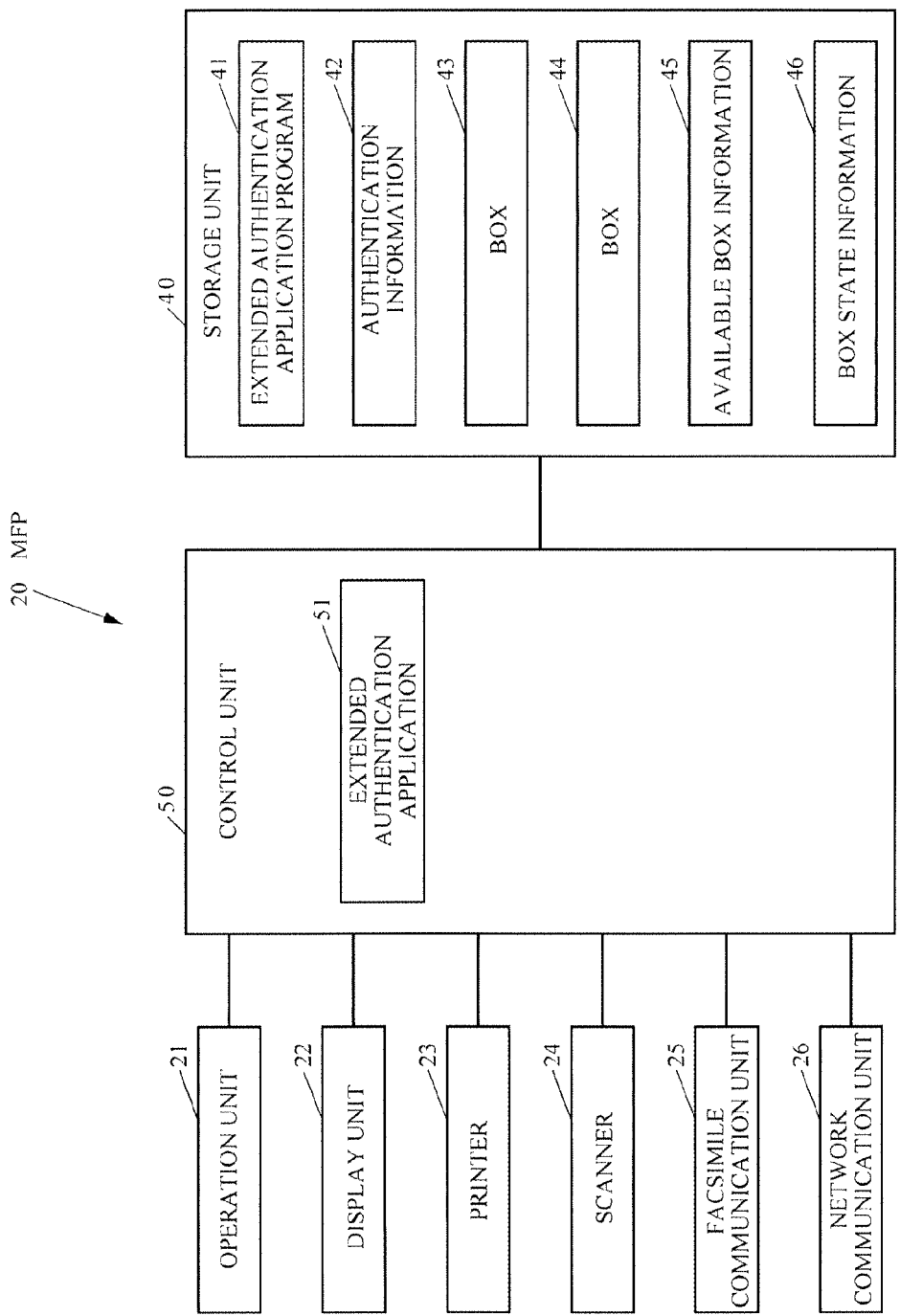
FIG. 2 illustrates a block diagram of an example multifunction peripheral (MFP), such as the MFP illustrated in FIG. 1.

FIG. 2 illustrates a block diagram of an example MFP, such as MFP 20 illustrated in FIG. 1.

As illustrated in FIG. 2, MFP 20 includes operation unit 21, display unit 22, printer 23, scanner 24, facsimile communication unit 25, and network communication unit 26. Operation unit 21 may include input devices, such as buttons, on which the user performs various input operations. Display unit 22 may include a display device, such as a liquid crystal display (LCD), which may display various kinds of information. Printer 23 may include a printing device that performs printing on recording media, such as paper. Scanner 24 may include a reading device that reads an image from an original document. Facsimile communication unit 25 may include a facsimile device that performs facsimile communication via a communication line, such as a public telephone line. Network communication unit 26 may include a network communication device that performs communication via networks, such as a LAN and/or the Internet.

Figure 3:
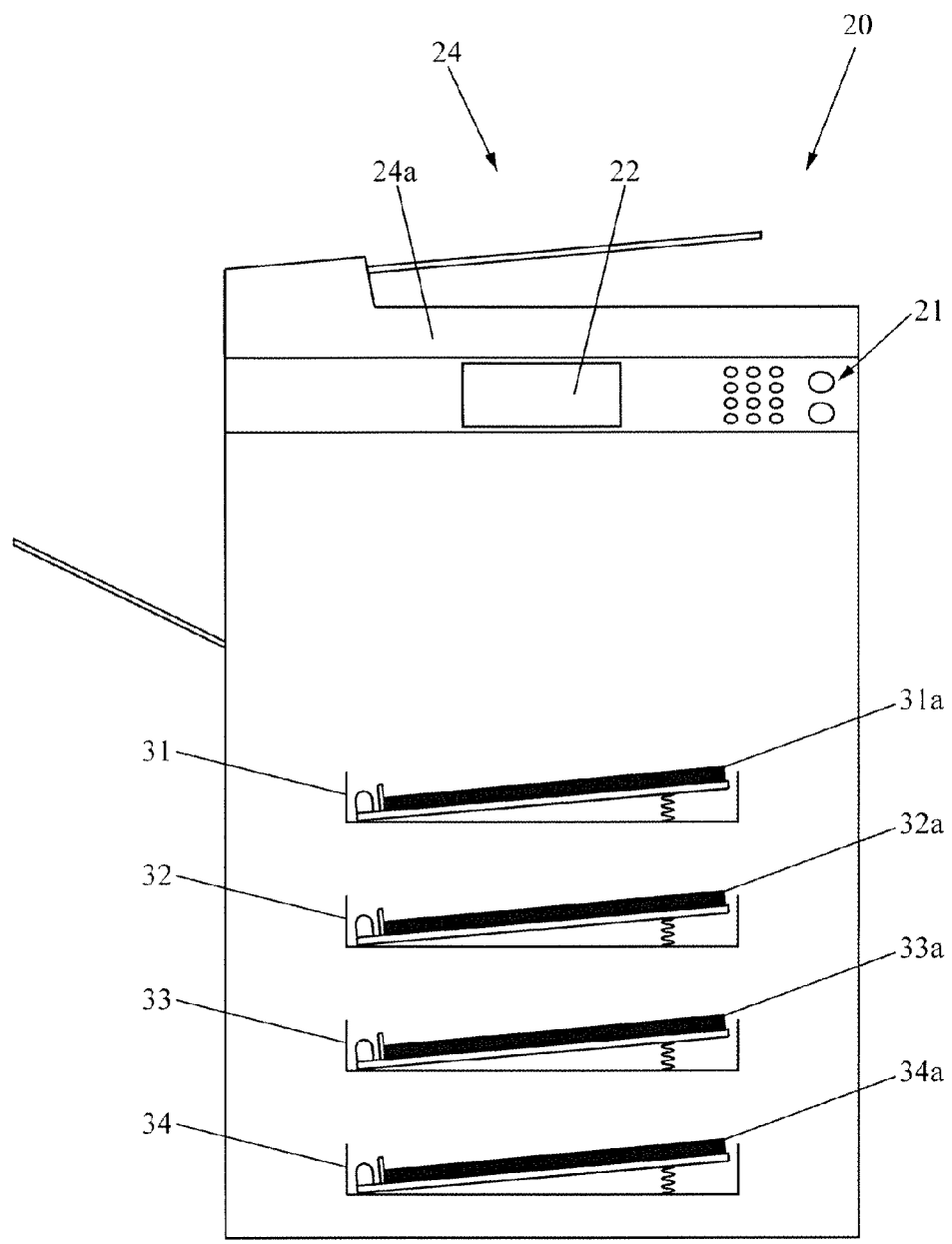
FIG. 3 illustrates an example apparatus configuration, possibly the configuration of the MFP illustrated in FIG. 1.

FIG. 3 illustrates an example apparatus configuration, possibly the configuration of MFP 20 illustrated in FIG. 1.

As illustrated in FIG. 3, MFP 20 includes A3 advertisement-printed medium holding unit 31 and A4 advertisement-printed medium holding unit 32, in which both may serve as advertisement-printed medium holding units. MFP 20 also includes A3 advertisement-printable medium holding unit 33 and A4 advertisement-printable medium holding unit 34, which both may serve as advertisement-printable medium holding units. A3 advertisement-printed medium holding unit 31 holds A3-sized advertisement-printed media (hereinafter, referred to as "A3 advertisement-printed media") 31a. A3 advertisement-printed media 31a may serve as advertisement-printed media, namely, recording media in which the back surface includes an advertisement that has been printed in advance. A4 advertisement-printed medium holding unit 32 holds A4-sized advertisement-printed media (hereinafter, referred to as "A4 advertisement-printed media") 32a. A3 advertisement-printable medium holding unit 33 holds A3-sized advertisement-printable media (hereinafter, referred to as "A3 advertisement-printable media") 33a, which may serve as advertisement-printable media, namely, recording media on which advertisements are printable. A4 advertisement-printable holding unit 34 holds A4-sized advertisement-printable media (hereinafter, referred to as "A4 advertisement-printable media") 34a. It is should be understood that A3 advertisement-printable media 33a and A4 advertisement-printable media 34a each have two surfaces (e.g., front and back of the recording media) and printing can be performed on both surfaces of the recording media. Thus, a recording media that is blank on both surfaces is likely recording media on which printing has not yet been performed.

Scanner 24 is provided in the upper part of MFP 20. Automatic document feeder 24a may be attached to scanner 24. Automatic document feeder 24a may be a device capable of automatically and sequentially conveying a plurality of original documents to a reading unit.

Operation unit 21 and display unit 22 are provided in the console located below scanner 24.

Referring back to FIG. 2, MFP 20 further includes storage unit 40 and control unit 50. Storage unit 40 includes storage devices, such as an electrically erasable programmable read only memory (EEPROM) and a hard disk drive (HDD), which store programs, e.g., a copy control program, and various kinds of data. Control unit 50 includes a computer that executes programs, e.g., the copy control program, and controls MFP 20.

Storage unit 40 stores extended authentication application program 41, which is a Java (registered trademark) application program for user authentication.

Extended authentication application program 41 may be installed into MFP 20 during production of MFP 20. Further, extended authentication application program 41 may be installed on to MFP 20 from a storage medium. In some instances, the program may be installed from a universal serial bus (USB) memory or an SD memory card. Alternatively, the program may be installed on to MFP 20 via networks, such as LAN 11 and the Internet.

Storage unit 40 stores authentication information 42 for user authentication. Authentication information 42 may include one or more sets of user identifiers (IDs) and passwords of individual users.

Storage unit 40 may store box 43 and box 44, which are areas where advertisements are stored, and which may be characterized as an advertisement storage unit described in this disclosure. A box is created for each advertisement type. A box is associated with a box ID, which identifies the box. Hereinafter, it is assumed that box 43 is associated with the box ID "1", and box 44 is associated with the box ID "2". In the first embodiment, an example case where there are two boxes will be described for simplicity. However, in some instances, there may be more than two boxes. For example, the number of boxes may be three or more.

Figure 4:
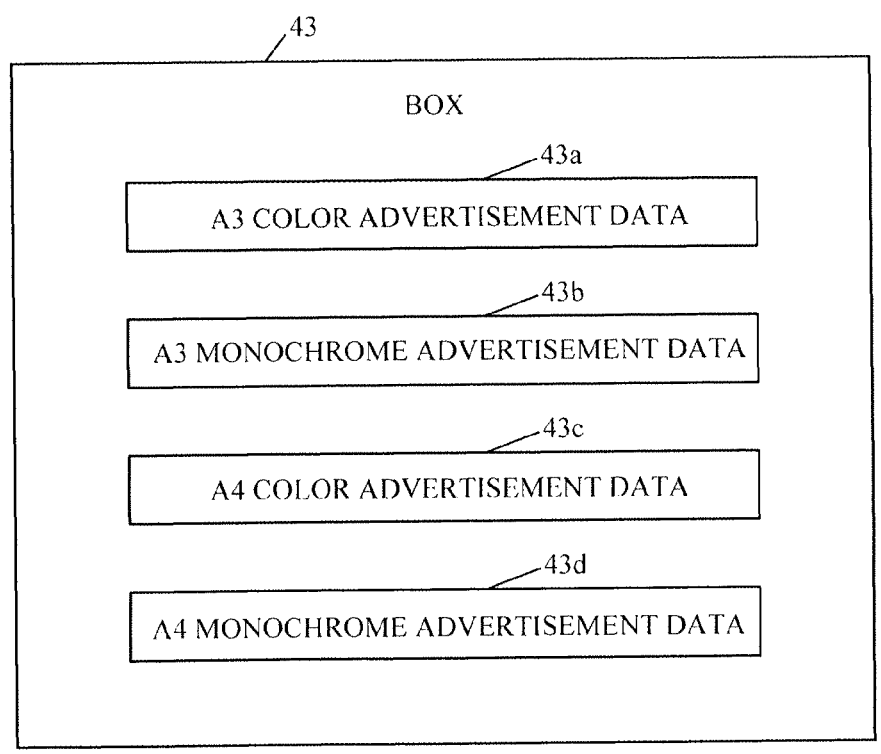
FIG. 4 illustrates an example of a box, possibly as illustrated in FIG. 2.

FIG. 4 illustrates an example of a box, possibly as illustrated in FIG. 2. In some instances, FIG. 4 may illustrate contents of box 43 illustrated in FIG. 2.

As illustrated in FIG. 4, box 43 can store A3 color advertisement data 43*a*, which is advertisement data for A3 color copying. Further, box 43 can store A3 monochrome advertisement data 43*b*, which is advertisement data for A3 monochrome copying. Yet further, box 43 can store A4 color advertisement data 43*c*, which is advertisement data for A4 color copying. In addition, box 43 can store A4 monochrome advertisement data 43*d*, which is advertisement data for A4 monochrome copying.

While box 43 has been described above, box 44 also has the similar configuration.

As illustrated in FIG. 2, storage unit 40 can store available box information 45, which specifies an available box by using the box ID.

Storage unit 40 can also store box state information 46, which represents the state of each box.

FIG. 5 illustrates an example of box state information, possibly as illustrated in FIG. 2. In some instances, FIG. 5 illustrates an example of contents of box state information 46 illustrated in FIG. 2.

As illustrated in FIG. 5, in box state information 46, the box ID and the state of the box are associated with each other. Examples of the state of the box include "usable", "reading", and "writing". The "usable" state indicates that data stored in the box is usable in an on-demand advertisement-attached copy process. The "reading" state indicates that data is being read from the box. The "writing" state indicates that data is being written in the box.

Here, on-demand advertisement-attached copying is one form of advertisement-attached copying, and corresponds to advertisement-printable medium copying. Advertisement-printable medium copying may involve advertisement data read from a box that is printed along with an image read by scanner 24 from an original document.

Control unit 50 illustrated in FIG. 2 includes, for example, a central processing unit (CPU), a read-only memory (ROM) that pre-stores programs and various kinds of data, and a random access memory (RAM) used as a work area of the CPU. The CPU executes programs stored in the ROM or storage unit 40.

Control unit 50 controls a copy process in which printer 23 prints an image read by scanner 24 from an original document on the front surface of a recording medium. Control unit 50 provides a copy control unit described in the present disclosure.

Control unit 50 executes extended authentication application program 41 stored in storage unit 40, thereby functioning as extended authentication application 51.

Figure 6:
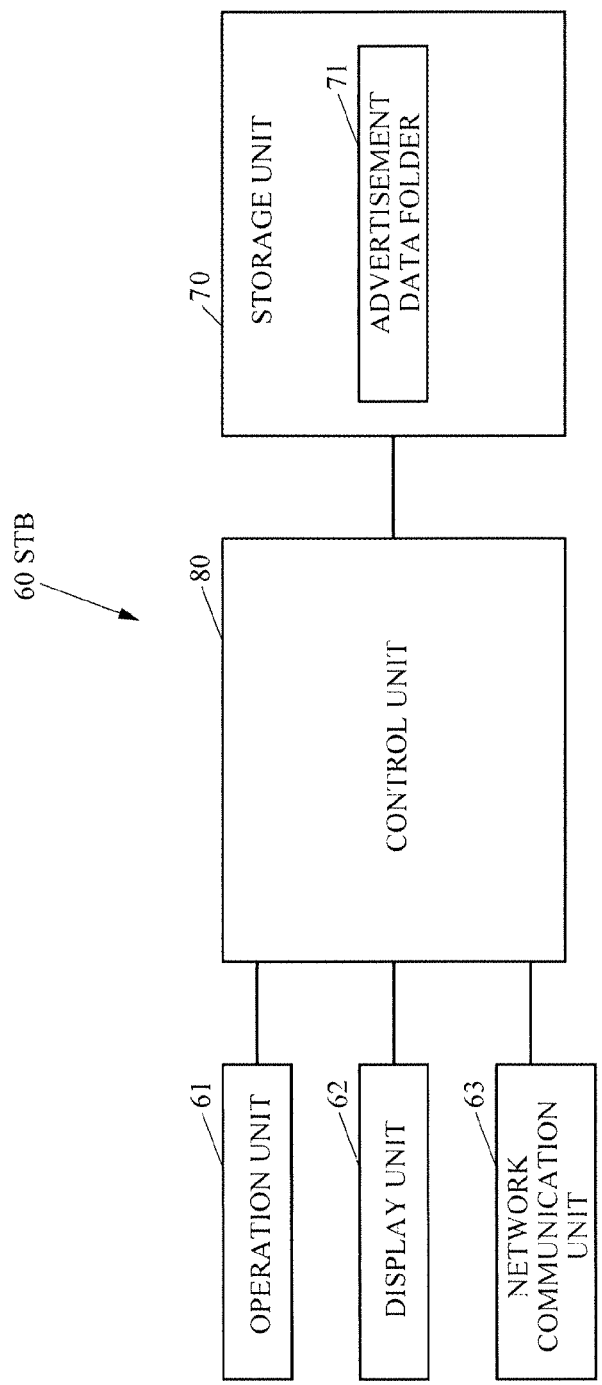
FIG. 6 is an example block diagram of a set-top box (STB), possibly as illustrated in FIG. 1.

FIG. 6 is an example block diagram of a set-top box (STB), possibly as illustrated in FIG. 1. In some instances, FIG. 6 is a block diagram of STB 60 illustrated in FIG. 1.

As illustrated in FIG. 6, STB 60 includes operation unit 61, display unit 62, network communication unit 63, storage unit 70, and control unit 80. Operation unit 61 includes input devices, such as a keyboard and a mouse, on which the user may perform various input operations. Display unit 62 includes a display device, such as an LCD, which may display various kinds of information. Network communication unit 63 includes a network communication device that performs communication via networks, such as LAN 11 and Internet 12. Storage unit 70 includes storage devices, such as an HDD, which stores various kinds of data, such as programs that may executed by a computer in an image forming apparatus. Control unit 80 controls STB 60 and is constituted by, for example, a PC.

Storage unit 70 can store advertisement data folder 71. In some instances, advertisement data folder 71 may include A3 color advertisement data, A3 monochrome advertisement data, A4 color advertisement data, and A4 monochrome advertisement data are stored in association with the box ID.

FIG. 7 illustrates an example of contents of an advertisement data folder. In some instances, FIG. 7 illustrates an example of contents of advertisement data folder 71 illustrated in FIG. 6.

As illustrated in FIG. 7, advertisement data folder 71 may include A3 color advertisement data, A3 monochrome advertisement data, A4 color advertisement data, and A4 monochrome advertisement data are stored in association with the box ID.

Control unit 80, illustrated in FIG. 6 may include, for example, a CPU, a ROM that pre-stores programs and various kinds of data, and a RAM that is used as a work area of the CPU. The CPU may execute programs stored in the ROM or storage unit 70.

Next, the operation of the network system will be described.

(Updating Advertisement in STB 60)

Possibly upon being instructed by the advertisement distributor to update an advertisement stored in the STB, the server may send a box ID to the STB. In some instances, the sever may send, via the Internet, the box ID specified by the advertisement update instruction of the advertisement distributor. In addition, the server may also send new advertisement data.

Figure 8:
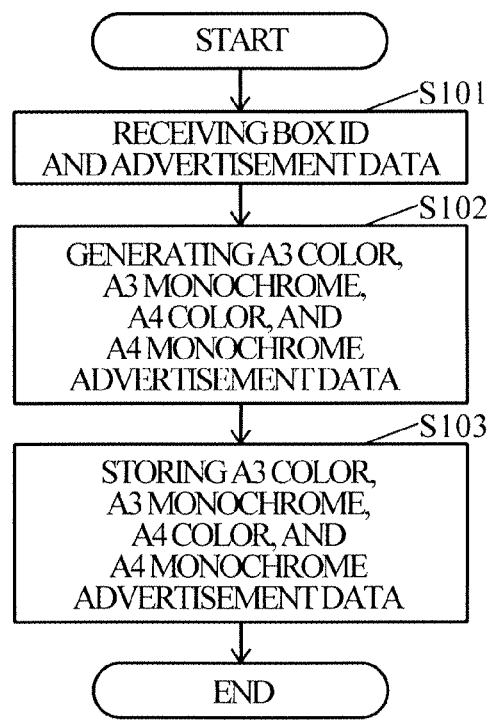
FIG. 8 illustrates an example flow of an operation, possibly for updating an advertisement performed by the STB.

In some instances, the control unit of the STB performs the operation illustrated in FIG. 8. In such instances, the control unit may perform when the box ID specified by the advertisement update instruction and the new advertisement data are sent from the server via the Internet.

FIG. 8 may also illustrate the flow of the operation for updating an advertisement, possibly as performed by the STB illustrated in FIG. 1.

As illustrated in FIG. 8, the control unit of the STB receives the box ID and the advertisement data which are sent from the server (S101).

Possibly based on the advertisement data received in S101, the control unit of the STB then generates A3 color advertisement data, A3 monochrome advertisement data, A4 color advertisement data, and A4 monochrome advertisement data, which are pieces of data that the MFP can print (S102).

The control unit of the STB then stores the A3 color advertisement data, the A3 monochrome advertisement data, the A4 color advertisement data, and the A4 monochrome advertisement data generated in S102. As such, the control unit may store this data in the advertisement data folder in association with the box ID that has been received in S101 (S103). In some instances, the advertisement data folder may already include stored data. If the advertisement data folder already stored the A3 color advertisement data, the A3 monochrome advertisement data, the A4 color advertisement data, and/or the A4 monochrome advertisement data that are associated with the box ID received in 5101, the control unit of the STB may overwrite these pieces of advertisement data associated with the box ID.

After performing the processing in S103, the control unit of the STB terminates the operation illustrated in FIG. 8.

(Updating Advertisement in MFP 20)

Figure 9:
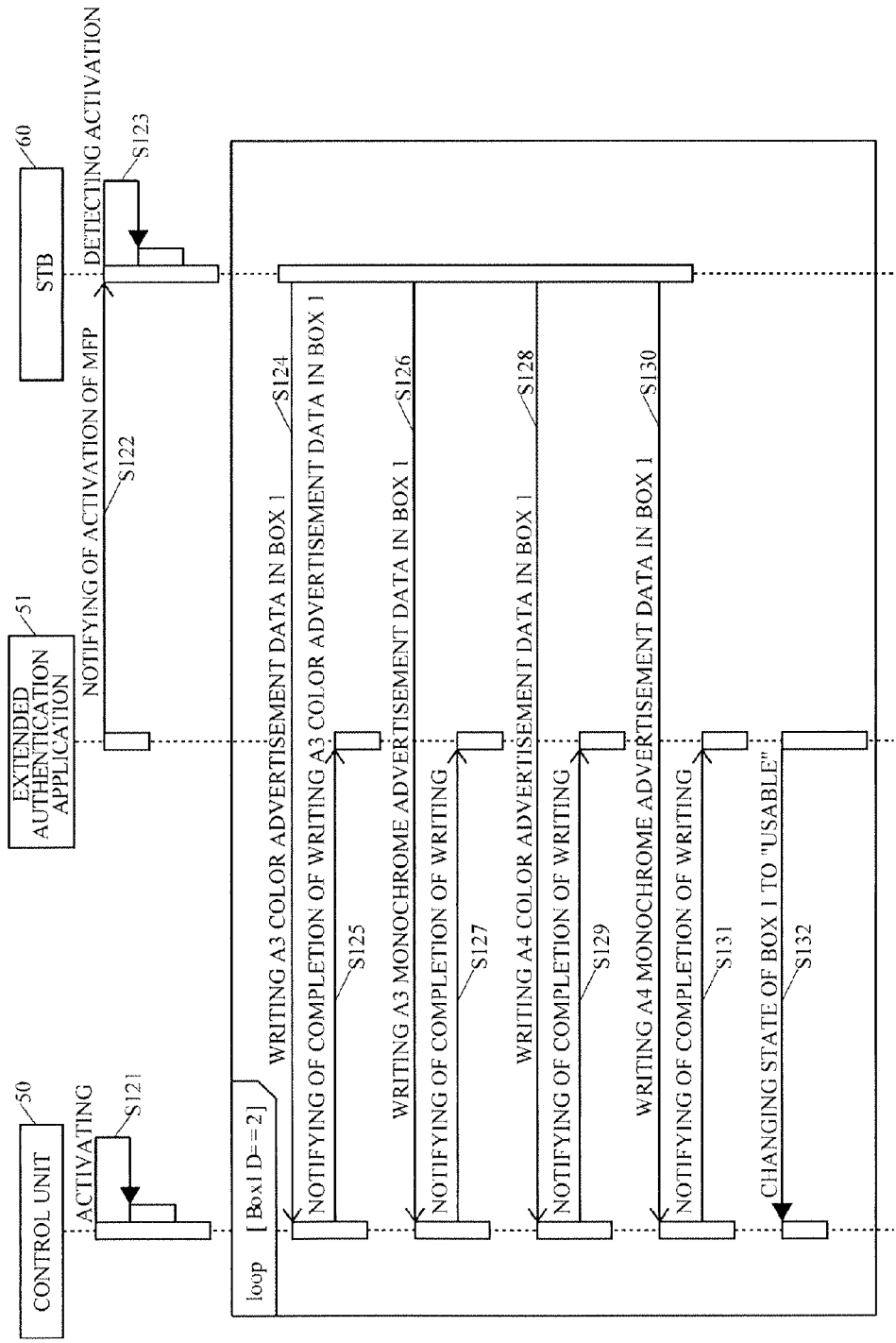
FIG. 9 illustrates a sequence, possibly for updating an advertisement stored in the MFP.

FIG. 9 illustrates a sequence, possibly for updating an advertisement stored in the MFP.

As illustrated in FIG. 9, once the MFP is activated and consequently, control unit 50 of the MFP is also activated (S121), extended authentication application 51 of control unit 50 notifies STB 60 of activating the MFP (S122).

STB 60 is notified of activation of the MFP by extended authentication application 51, thereby detecting activation of the MFP (S123).

Upon detecting activation of the MFP, STB 60 writes A3 color advertisement data in box 1. The A3 color advertisement data is associated with the box ID "1" in the advertisement data folder stored in the storage unit of the STB (S124). If the box assigned the box ID "1" does not exist in the storage unit of the MFP, STB 60 creates the box assigned with box ID "1" in the storage unit of the MFP. Referring to FIG. 9, the term "box 1" indicates the box assigned with box ID "1".

Once writing of the A3 color advertisement data in the box is completed, control unit 50 of the MFP notifies extended authentication application 51 that writing of the A3 color advertisement data in the box has been completed (S125).

After performing the processing in S124, STB 60 writes A3 monochrome advertisement data in BOX 1. The A3 monochrome advertisement data is associated with box ID "1" in the advertisement data folder stored in the storage unit of STB 60 (S126).

Once writing of the A3 monochrome advertisement data in the box is completed, control unit 50 of the MFP notifies extended authentication application 51 that writing of the A3 monochrome advertisement data in the box has been completed (S127).

After performing the processing in S126, STB 60 writes A4 color advertisement data in box 1. The A4 color advertisement data is associated with the box ID "1" in the advertisement data folder stored in the storage unit of STB 60 (S128).

Once writing of the A4 color advertisement data in the box is completed, control unit 50 of the MFP notifies extended authentication application 51 that writing of the A4 color advertisement data in the box has been completed (S129).

After performing the processing in S128, STB 60 writes, as A4 monochrome advertisement data, in the box 1. The A4 monochrome advertisement data is associated with the box ID "1" in advertisement data folder 71 stored in the storage unit of STB 60 (S130).

Once writing of the A4 monochrome advertisement data in the box is completed, control unit 50 of the MFP notifies extended authentication application 51 that writing of the A4 monochrome advertisement data in the box has been completed (S131).

Upon being notified that writing of the A3 color advertisement data, the A3 monochrome advertisement data, the A4 color advertisement data, and the A4 monochrome advertisement data in box 1 has been completed, extended authentication application 51 changes the state of the box. The state of box 1 is changed to "usable" in the box state information stored in the storage unit of the MFP (S132).

The processing from S124 to S132 is repeated for all box IDs in the advertisement data folder stored in the storage unit of STB 60.

Figure 10:
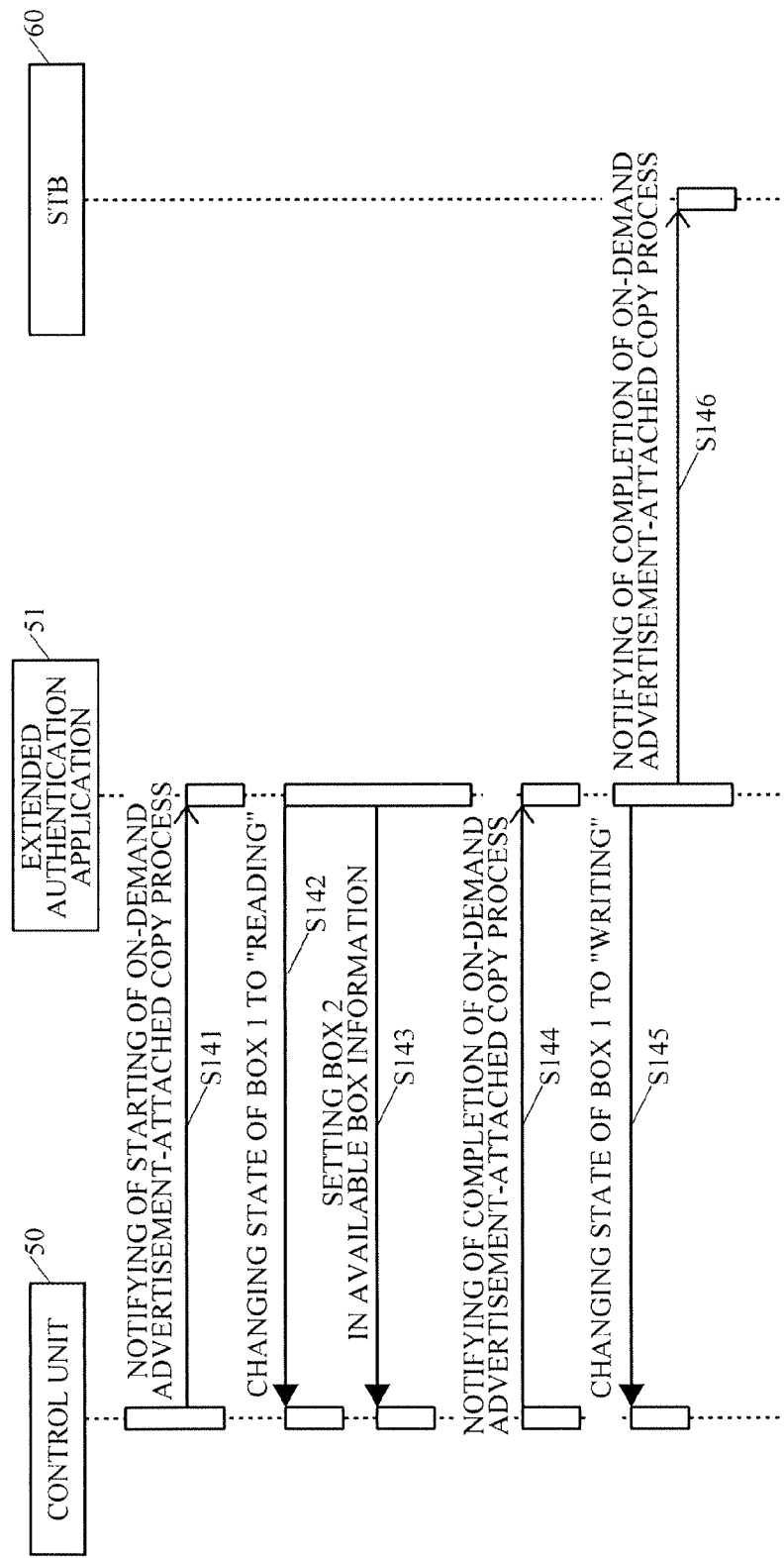
FIG. 10 illustrates another sequence, possibly that follows the sequence illustrated in FIG. 9.

FIG. 10 illustrates another sequence. In some instances, FIG. 10 illustrates a sequence that follows the sequence illustrated in FIG. 9.

As illustrated in FIG. 10, upon starting an on-demand advertisement-attached copy process, control unit 50 notifies extended authentication application 51 that the on-demand advertisement-attached copy process has been started (S141).

In some instances, extended authentication application 51 may be notified by control unit 50 that the on-demand advertisement copy process has been started. If extended authentication application 51 determines that the state of the box identified in the on-demand advertisement-attached copy process is "usable" after being notified, extended authentication application 51 changes the state of the box to "reading" in the box state information stored in the storage unit of the MFP (S142). While FIG. 10 illustrates the box assigned the box ID "1" as an example, this box corresponds to the box identified in the on-demand advertisement-attached copy process in practice.

Subsequently, the extended authentication application 51 sets, in the available box information stored in the storage unit of the MFP, the next box ID of the box ID of the currently available box in a certain order (S143), for example in the ascending order. FIG. 10 illustrates the box assigned the box ID "2" as an example.

After completing the on-demand advertisement-attached copy process, control unit 50 notifies extended authentication application 51 that the on-demand advertisement-attached copy process has been completed along with the box ID of the box identified in the on-demand advertisement-attached copy process (S144).

Upon being notified, by control unit 50, that the on-demand advertisement-attached copy process has been completed, extended authentication application 51 changes the state of the box assigned the box ID that extended authentication application 51 has been notified of by control unit 50 in S144 to "writing" in the box state information stored in the storage unit of the MFP (S145).

Extended authentication application 51 then notifies STB 60 that the on-demand advertisement-attached copy process has been completed along with the box ID that extended authentication application 51 has been notified of by control unit 50 in S144 (S146).

Figure 11:
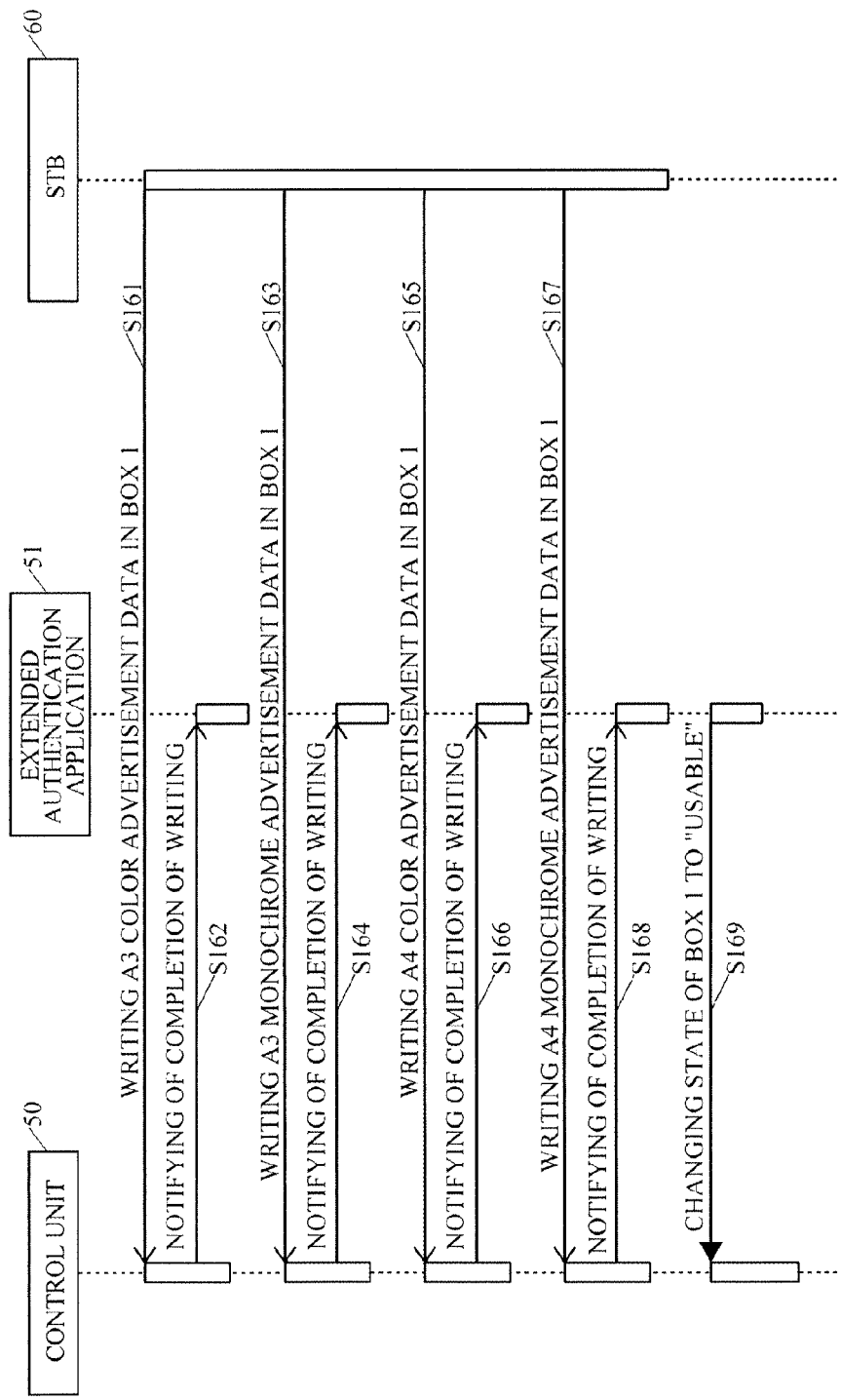
FIG. 11 illustrates yet another sequence, possibly that follows the sequence illustrated in FIG. 10.

FIG. 11 illustrates yet another sequence. In some instances, FIG. 11 is a sequence that follows the sequence illustrated in FIG. 10.

As illustrated in FIG. 11, STB 60 is notified, by extended authentication application 51, that the on-demand advertisement-attached copy process has been completed. STB 60 then writes, in the box assigned the box ID notified by extended authentication application 51 in S146 among the boxes stored in the storage unit of the MFP, the A3 color advertisement data that is associated with this notified box ID stored in the advertisement data folder of the storage unit of STB 60 (S161).

Once writing of the A3 color advertisement data in the box is completed, control unit 50 of the MFP notifies extended authentication application 51 that writing of the A3 color advertisement data in the box has been completed (S162).

After performing the processing in S161, STB 60 writes, in the box assigned the notified box ID among the boxes stored in storage unit 40 of MFP 20, the A3 monochrome advertisement data that is associated with this box ID in advertisement data folder 71 stored in storage unit 70 (S163).

Once writing of the A3 monochrome advertisement data in the box is completed, control unit 50 of the MFP notifies extended authentication application 51 that writing of the A3 monochrome advertisement data in the box has been completed (S164).

After performing the processing in S163, STB 60 writes, in the box assigned the notified box ID among the boxes stored in the storage unit of the MFP, the A4 color advertisement data that is associated with this box ID in the advertisement data folder stored in the storage unit of STB 60 (S165).

Once writing of the A4 color advertisement data in the box is completed, control unit 50 of the MFP notifies extended authentication application 51 that writing of the A4 color advertisement data in the box has been completed (S166).

After performing the processing in S165, STB 60 writes, in the box assigned the notified box ID among the boxes stored in the storage unit of the MFP, the A4 monochrome advertisement data that is associated with this box ID in the advertisement data folder stored in the storage unit of STB 60 (S167).

Once writing of the A4 monochrome advertisement data in the box is completed, control unit 50 of the MFP notifies extended authentication application 51 that writing of the A4 monochrome advertisement data in the box has been completed (S168).

After being notified, by control unit 50, that writing of the A3 color advertisement data, the A3 monochrome advertisement data, the A4 color advertisement data, and the A4 monochrome advertisement data in the box has been completed, extended authentication application 51 then changes the state of the box to "usable" in the box state information stored in the storage unit of the MFP (S169).

The processing from S141 to S169 is performed every time the on-demand advertisement-attached copy process is performed.

(Copying)

Figure 12:
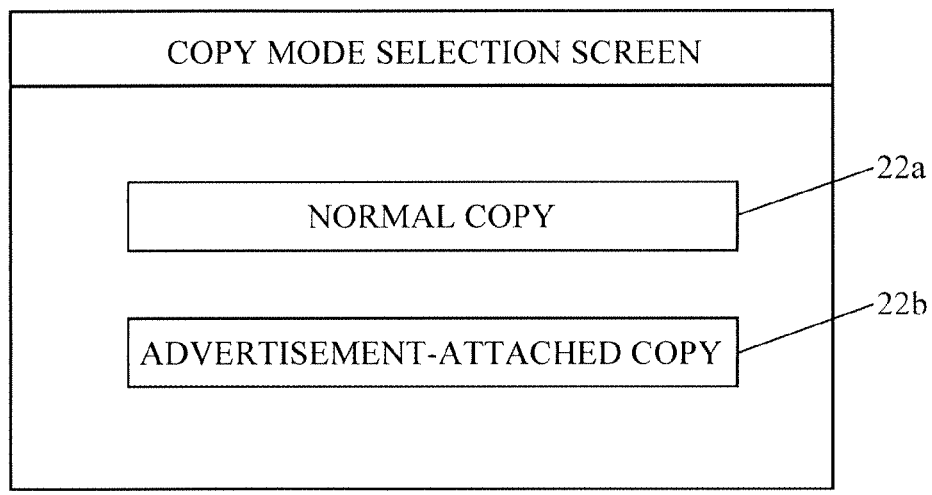
FIG. 12 illustrates an example copy mode selection screen, as possibly displayed on a display unit of the MFP.

After the MFP is activated, the extended authentication application of the control unit of the MFP displays a copy mode selection screen illustrated in FIG. 12 on the display unit of the MFP.

FIG. 12 illustrates an example copy mode selection screen. In some instances, FIG. 12 illustrates the copy mode selection screen displayed on the display unit of the MFP.

As illustrated in FIG. 12, the copy mode selection screen includes normal copy button 22a, which is a button used to specify advertisement-free normal copying, and an advertisement-attached copy button 22b, which is a button used to specify advertisement-attached copying.

When the normal copy button 22a is pushed via the operation unit, the control unit of the MFP can perform copying by using an A3 advertisement-printable medium conveyed from the A3 advertisement-printable medium holding unit in the case of A3-size copying and can perform copying by using an A4 advertisement-printable medium conveyed from the A4 advertisement-printable medium holding unit in the case of A4-size copying. At this time, the control unit of the MFP can perform any of double-sided copying in which copying is performed on the both surfaces of the recording medium, color copying, and monochrome copying.

Figure 13:
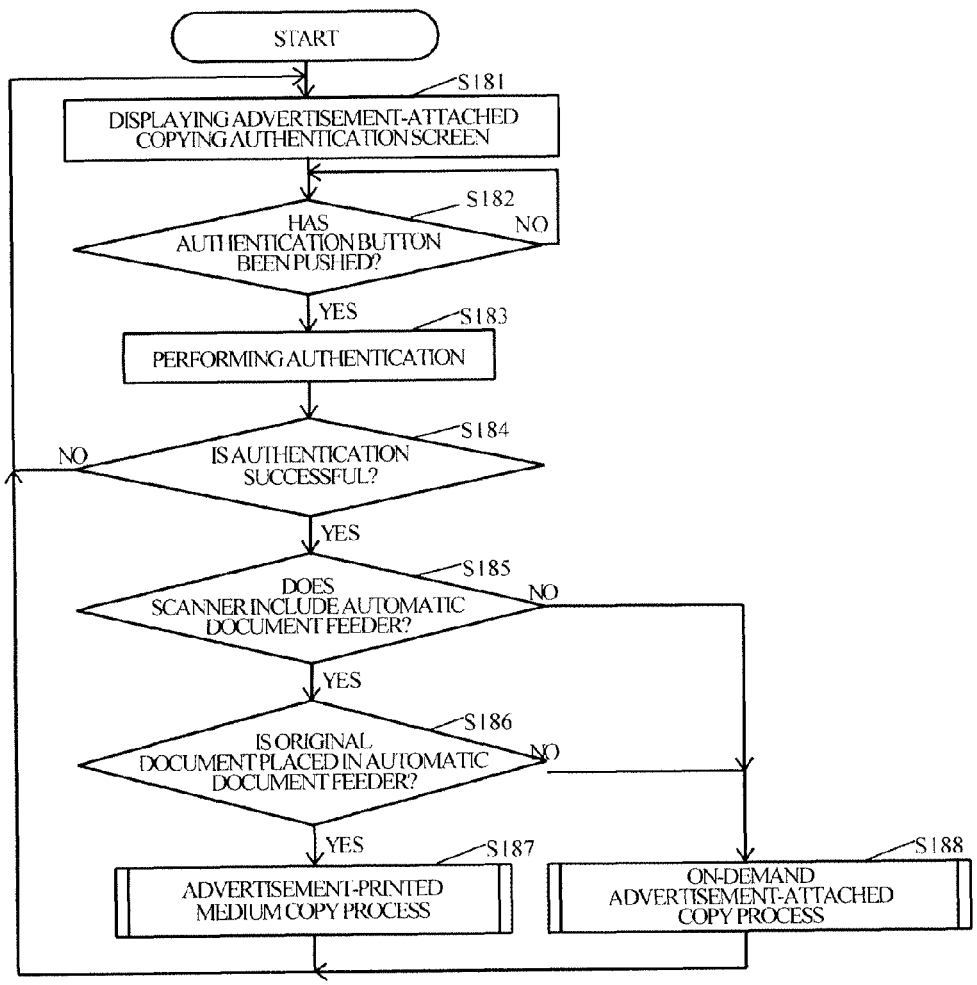
FIG. 13 illustrates another example flow of the operation, possibly for advertisement-attached copying performed by a control unit of the MFP.

When advertisement-attached copy button 22b is pushed via the operation unit, the control unit of the MFP performs the operation illustrated in FIG. 13.

FIG. 13 illustrates another example flow of the operation. In some instances, FIG. 13 illustrates the flow of the operation for advertisement-attached copying performed by the control unit of the MFP.

Figure 14:
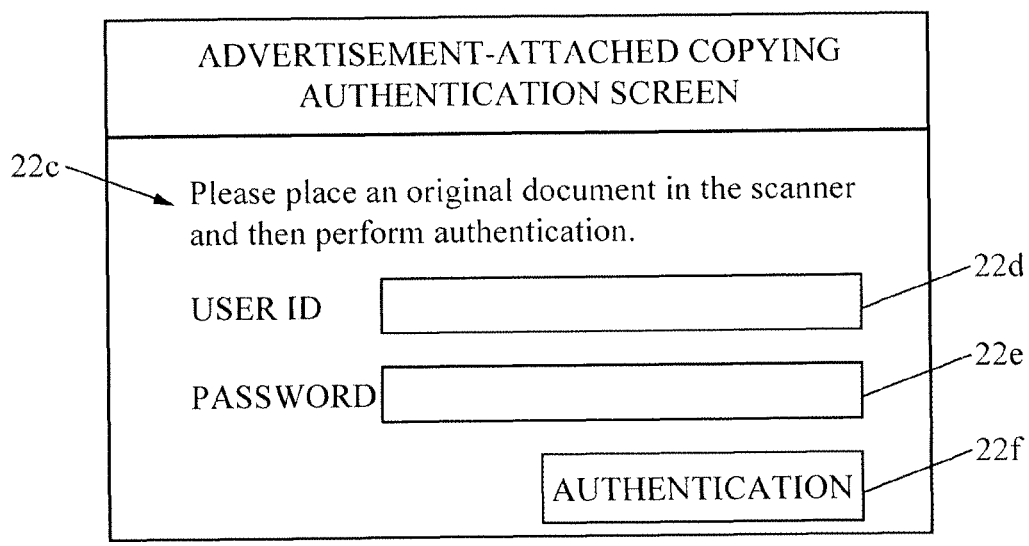
FIG. 14 illustrates an example advertisement-attached copying authentication screen, possibly displayed on the display unit of the MFP.

As illustrated in FIG. 13, the extended authentication application of the control unit of the MFP displays, on the display unit, an advertisement-attached copying authentication screen illustrated in FIG. 14 (S181).

FIG. 14 illustrates an example advertisement-attached copying authentication screen. In some instances, FIG. 14 illustrates the advertisement-attached copying authentication screen displayed on the display unit of the MFP.

As illustrated in FIG. 14, the advertisement-attached copying authentication screen includes message 22c, user ID textbox 22d, password textbox 22e, and authentication button 22f. Message 22c prompts the user to place the original document in the scanner and then perform authentication. User ID textbox 22d is a textbox in which the user ID for use in authentication is input via the operation unit. Password textbox 22e is a textbox in which the password for use in authentication is input via the operation unit. Authentication button 22f is a button with which an instruction to perform authentication is given via the operation unit.

As illustrated in FIG. 13, after performing the processing in S181, the extended authentication application determines whether or not the authentication button has been pushed (S182).

Upon determining in S182 that the authentication button has been pushed, the extended authentication application performs authentication based on the user ID input in the user ID textbox and the password input in the password textbox (S183). Specifically, if the combination of the user ID input in the user ID textbox and the password input in the password textbox is found in authentication information 42 stored in the storage unit of the MFP, the extended authentication application determines that authentication is successful. Otherwise, the extended authentication application determines that authentication is unsuccessful.

After performing the processing in S183, the extended authentication application determines whether or not authentication performed in S183 is successful (S184).

If the extended authentication application determines in S184 that authentication performed in S183 is unsuccessful, the process returns to S181 again.

On the other hand, after determining in S184 that authentication performed in S183 is successful, the extended authentication application determines whether or not the scanner includes the automatic document feeder on the basis of a signal supplied from the scanner (S185).

After determining in S185 that the scanner includes the automatic document feeder, the extended authentication application determines whether or not at least one original document is placed in the automatic document feeder on the basis of a signal supplied from the scanner (S186).

Figure 15:
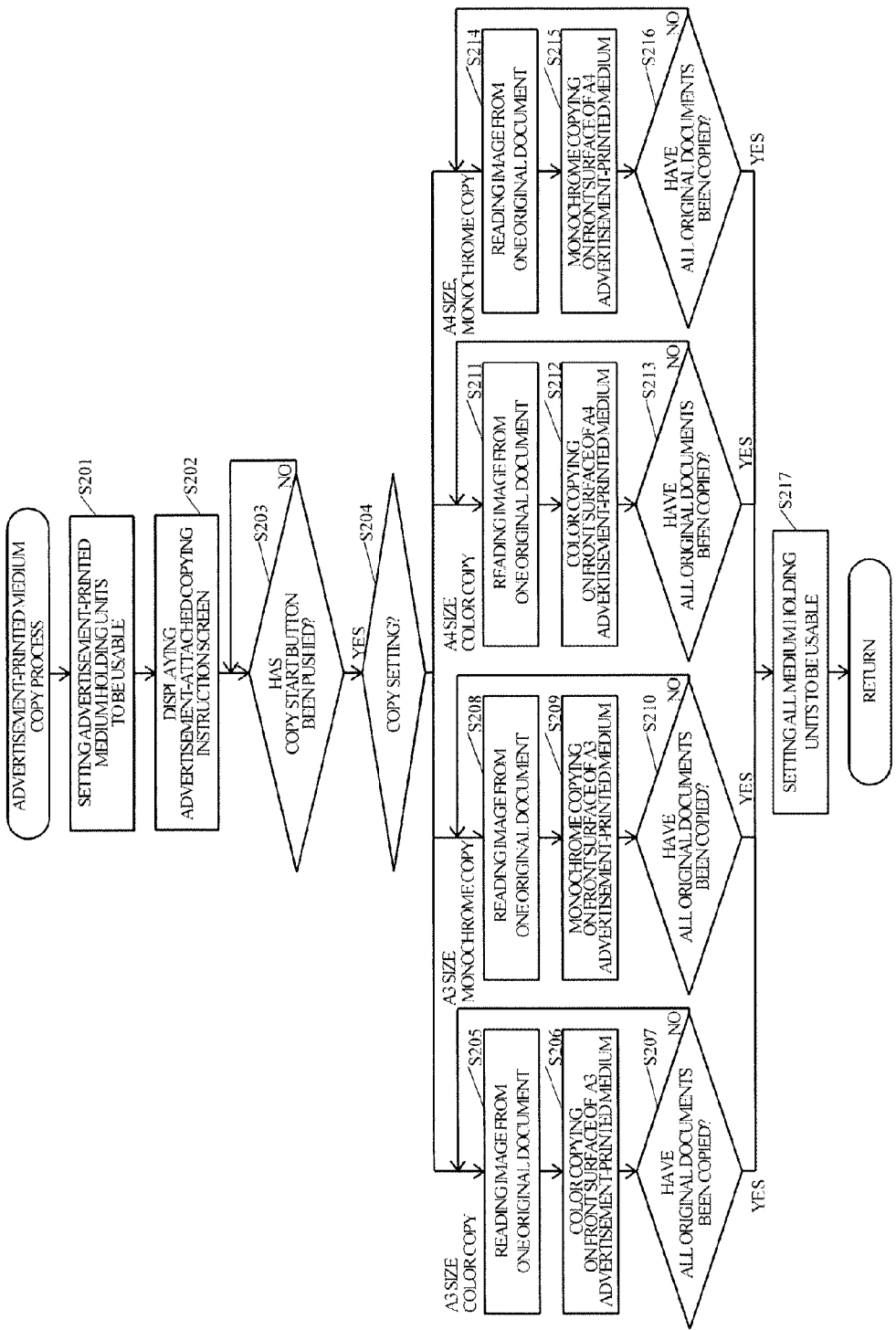
FIG. 15 illustrates an example flow of an advertisement-printed medium copy process.

If the extended authentication application determines in S186 that at least one original document is placed in the automatic document feeder, control unit 50 performs an advertisement-printed medium copy process illustrated in FIG. 15 (S187). This advertisement-printed medium copy process is one form of advertisement-attached copying, in which a recording medium conveyed from A3 advertisement-printed medium holding unit 31 or A4 advertisement-printed medium holding unit 32 is used.

FIG. 15 illustrates the flow of the advertisement-printed medium copy process.

As illustrated in FIG. 15, the control unit of the MFP sets only the A3 advertisement-printed medium holding unit and the A4 advertisement-printed medium holding unit to be usable. In such instances, the A3 advertisement-printed medium holding unit, the A4 advertisement-printed medium holding unit, the A3 advertisement-printable medium holding unit, and the A4 advertisement-printable medium holding unit (S201) may not be set to usable.

Figure 16:
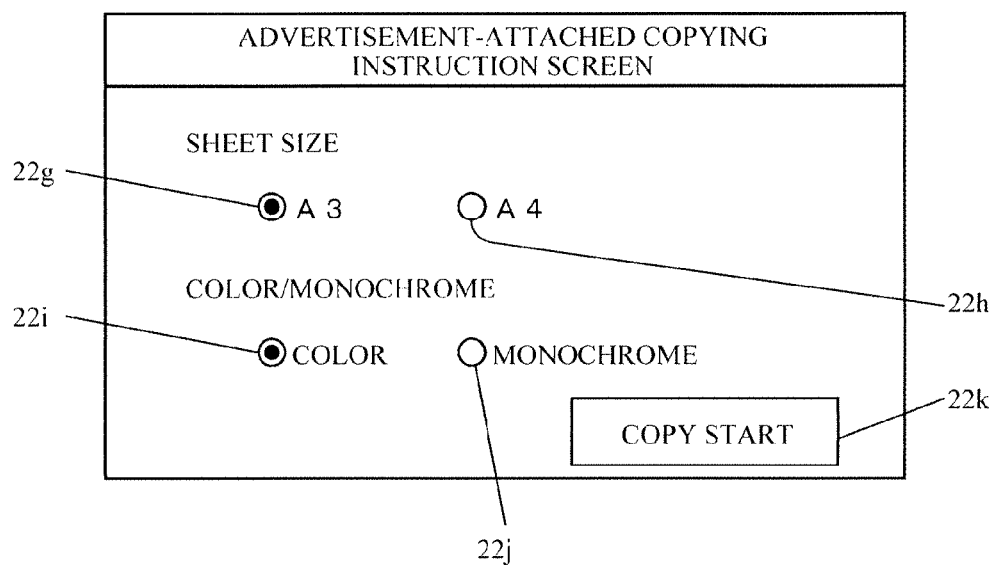
FIG. 16 illustrates an example advertisement-attached copy instruction screen, possibly displayed on the display unit of the MFP.

The control unit then displays, on the display unit, an advertisement-attached copying instruction screen illustrated in FIG. 16 (S202).

FIG. 16 illustrates the advertisement-attached copying instruction screen displayed on the display unit of the MFP.

As illustrated in FIG. 16, the advertisement-attached copying instruction screen is a screen on which the recording medium size ("sheet size" in FIG. 16) used in copying and color or monochrome copying are specified. The advertisement-attached copying instruction screen includes A3 radio button 22g, A4 radio button 22h, color radio button 22i, monochrome radio button 22j, and copy start button 22k. With A3 radio button 22g, A3 recording media are specified as recording media used in copying via the operation unit. With A4 radio button 22h, A4 recording media are specified as recording media used in copying via the operation unit. With color radio button 22i, color copying is specified via the operation unit. With monochrome radio button 22j, monochrome copying is specified via the operation unit. With copy start button 22k, an instruction to start copying is given via the operation unit. Only one of A3 radio button 22g and A4 radio button 22h is selected. Also, only one of color radio button 22i and monochrome radio button 22j is selected.

As illustrated in FIG. 15, after performing the processing in S202, the control unit of the MFP determines whether or not the copy start button has been pushed (S203).

If the control unit of the MFP determines in S203 that the copy start button has been pushed, the control unit of the MFP then determines the copy settings made with the A3 radio button, the A4 radio button, the color radio button, and the monochrome radio button (S204).

If the control unit of the MFP determines in S204 that the A3 radio button and the color radio button are selected, the control unit of the MFP then reads an image from one original document by using the scanner (S205).

The control unit of the MFP then performs, by using the printer, color copying on the front surface of an A3 advertisement-printed medium conveyed from the A3 advertisement-printed medium holding unit (S206). Specifically, the control unit of the MFP directs the printer to print the image read in S205 in color on the front surface of the A3 advertisement-printed medium.

Subsequently, the control unit of the MFP determines whether or not all the original documents have been copied (S207).

If the control unit of the MFP determines in S207 that all the original documents have not been copied, the process returns to S205 in order to copy the remaining original documents.

If the control unit of the MFP determines in S204 that the A3 radio button and the monochrome radio button are selected, the control unit of the MFP then reads an image from one original document by using the scanner (S208).

Then, the control unit of the MFP performs, by using the printer, monochrome copying on the front surface of an A3 advertisement-printed medium conveyed from the A3 advertisement-printed medium holding unit (S209). Specifically, the control unit of the MFP directs the printer to print the image read in S208 in monochrome on the front surface of the A3 advertisement-printed medium.

Subsequently, the control unit of the MFP determines whether or not all the original documents have been copied (S210).

If the control unit of the MFP determines in S210 that all the original documents have not been copied, the process returns to S208 in order to copy the remaining original documents.

If the control unit of the MFP determines in S204 that the A4 radio button and the color radio button are selected, the control unit of the MFP then reads an image from one original document by using the scanner (S211).

Then, the control unit of the MFP performs, by using the printer, color copying on the front surface of an A4 advertisement-printed medium conveyed from the A4 advertisement-printed medium holding unit (S212). Specifically, the control unit of the MFP directs the printer to print the image read in S211 in color on the front surface of the A4 advertisement-printed medium.

Subsequently, the control unit of the MFP determines whether or not all the original documents have been copied (S213).

If the control unit of the MFP determines in S213 that all the original documents have not been copied, the process returns to S211 in order to copy the remaining original documents.

If the control unit of the MFP determines in S204 that the A4 radio button and the monochrome radio button are selected, the control unit of the MFP then reads an image from one original document by using the scanner (S214).

Then, the control unit of the MFP performs, by using the printer, monochrome copying on the front surface of an A4 advertisement-printed medium conveyed from the A4 advertisement-printed medium holding unit (S215). Specifically, the control unit of the MFP directs the printer to print the image read in S214 on the front surface of the A4 advertisement-printed medium in monochrome.

Subsequently, the control unit of the MFP determines whether or not all the original documents have been copied (S216).

If the control unit of the MFP determines in S216 that all the original documents have not been copied, the process returns to S214 in order to copy the remaining original documents.

After determining in S207, S210, S213, or S216 that all the original documents have been copied, the control unit of the MFP then sets medium holding units to be usable. Accordingly, the A3 advertisement-printed medium holding unit, the A4 advertisement-printed medium holding unit, the A3 advertisement-printable medium holding unit, and the A4 advertisement-printable medium holding unit are set to being usable (S217), and the MFP terminates the advertisement-printed medium copy process.

As illustrated in FIG. 13, the process returns to S181 again after the control unit of the MFP terminates the advertisement-printed medium copy process in S187.

Figure 17:
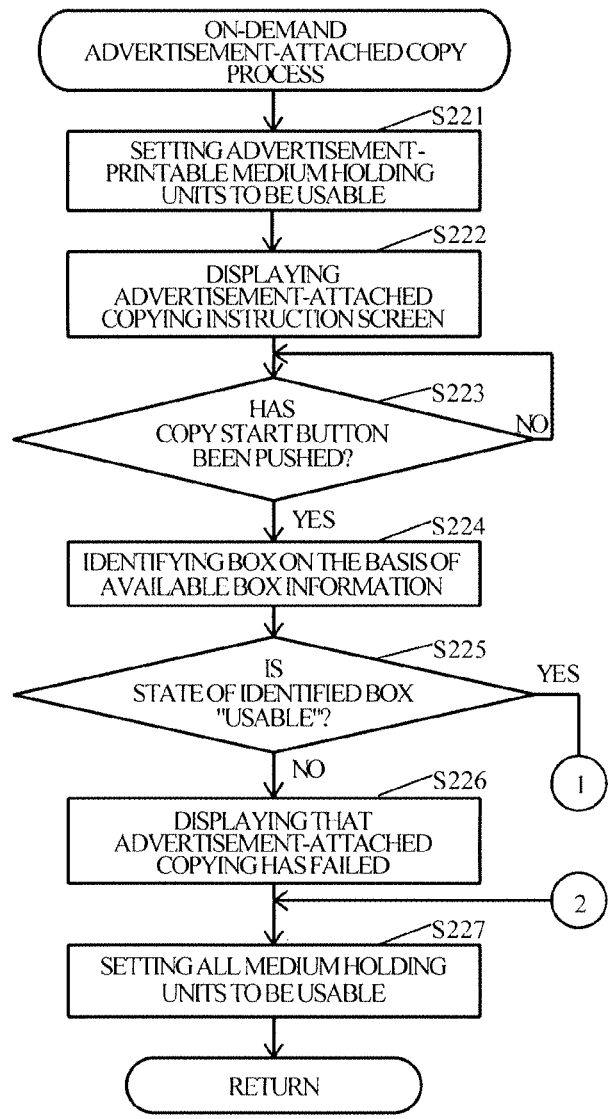
FIG. 17 illustrates an example flow of an on-demand advertisement-attached copy process.
Figure 18:
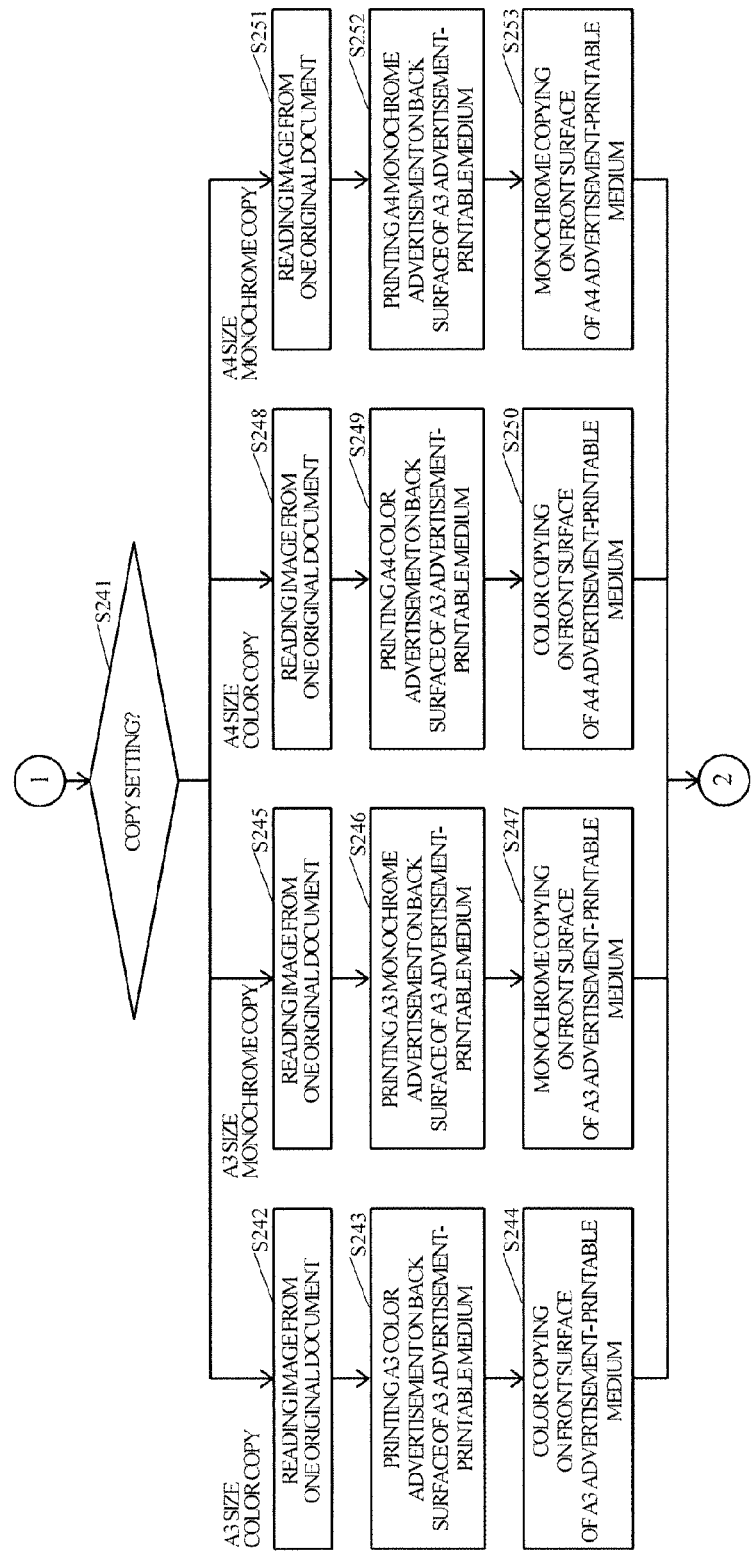
FIG. 18 illustrates another example flow, possibly that follows the process illustrated in FIG. 17.

If it is determined in S185 that the scanner does not include the automatic document feeder or if it is determined in S186 that no original document is placed in the automatic document feeder, the control unit of the MFP performs an on-demand advertisement-attached copy process illustrated in FIGS. 17 and 18 (S188). In this on-demand advertisement-attached copy process, recording media conveyed from the A3 advertisement-printable medium holding unit or the A4 advertisement-printable medium holding unit are used.

FIG. 17 illustrates an example flow of an on-demand advertisement-attached copy process. In some instances, FIG. 18 illustrates the flow that follows the process illustrated in FIG. 17.

As illustrated in FIG. 17, the control unit of the MFP may set only the A3 advertisement-printable medium holding unit and the A4 advertisement-printable medium holding unit to be usable. In such instances, the A3 advertisement-printed medium holding unit, the A4 advertisement-printed medium holding unit, the A3 advertisement-printable medium holding unit, and the A4 advertisement-printable medium holding unit (S221) may not be set to usable.

The control unit of the MFP then displays, on the display unit of the MFP, the advertisement-attached copying instruction screen illustrated in FIG. 16 (S222).

Subsequently, as illustrated in FIG. 17, the control unit of the MFP repeatedly determines whether the copy start button has been pushed (S223).

Upon determining in S223 that the copy start button has been pushed, control unit 50 of the MFP identifies the box on the basis of the available box information stored in the storage unit of the MFP (S224).

Based on the box state information stored in the storage unit of the MFP, the control unit of the MFP determines whether or not the state of the box identified in S224 is "usable" (S225).

If the control unit of the MFP determines in S225 that the state of the box is not "usable", the control unit of the MFP then displays on the display unit of the MFP that advertisement-attached copying has failed because of a defect (S226).

Then, the control unit of the MFP sets medium holding units to usable. In such instances, the A3 advertisement-printed medium holding unit, the A4 advertisement-printed medium holding unit, the A3 advertisement-printable medium holding unit, and the A4 advertisement-printable medium holding unit may be set to usable (S227), and further, the on-demand advertisement-attached copy process may be terminated.

If the control unit of the MFP determines in S225 that the state of the box is "usable", the control unit of the MFP then determines the copy settings made with the A3 radio button, the A4 radio button, the color radio button, and the monochrome radio button as illustrated in FIG. 18 (S241).

Upon determining in S241 that the A3 radio button and the color radio button are selected, the control unit of the MFP reads an image from an original document by using the scanner (S242).

Then, the control unit of the MFP directs the printer to print an advertisement based on the A3 color advertisement data stored in the box identified in S224 in color on the back surface of an A3 advertisement-printable medium conveyed from the A3 advertisement-printable medium holding unit (S243).

Subsequently, the control unit of the MFP performs color copying on the front surface of the A3 advertisement-printable medium (S244). Specifically, the control unit of the MFP prints directs the printer to print the image read in S242 in color on the front surface of the A3 advertisement-printable medium.

If the control unit of the MFP determines in S241 that the A3 radio button and the monochrome radio button are selected, the control unit of the MFP then reads an image from an original document by using the scanner (S245).

Then, the control unit of the MFP directs the printer to print an advertisement based on the A3 monochrome advertisement data stored in the box identified in S224. The advertisement may be printed in monochrome on the back surface of an A3 advertisement-printable medium conveyed from the A3 advertisement-printable medium holding unit (S246).

Subsequently, the control unit of the MFP performs monochrome copying on the front surface of the A3 advertisement-printable medium (S247). Specifically, the control unit of the MFP directs the printer to print the image read in S245. The image may be printed in monochrome on the front surface of the A3 advertisement-printable medium.

If the control unit of the MFP determines in S241 that the A4 radio button and the color radio button are selected, the control unit of the MFP then reads an image from an original document by using the scanner (S248).

Then, the control unit of the MFP directs the printer to print an advertisement based on the A4 color advertisement data stored in the box identified in S224. The advertisement may be printed in color on the back surface of an A4 advertisement-printable medium conveyed from the A4 advertisement-printable medium holding unit (S249).

Subsequently, the control unit of the MFP performs color copying on the front surface of the A4 advertisement-printable medium (S250). Specifically, the control unit of the MFP directs the printer to print the image read in S248 on the front surface of the A4 advertisement-printable medium.

If the control unit of the MFP determines in S241 that the A4 radio button and the monochrome radio button are selected, the control unit of the MFP then reads an image from an original document by using the scanner (S251).

Then, the control unit of the MFP directs the printer to print in monochrome, an advertisement based on the A4 monochrome advertisement data stored in the box identified in S224. The advertisement may be printed on the back surface of an A4 advertisement-printable medium conveyed from the A4 advertisement-printable medium holding unit (S252).

Subsequently, the control unit of the MFP performs monochrome copying on the front surface of the A4 advertisement-printable medium (S253). Specifically, the control unit of the MFP directs the printer to print the image read in S251 in monochrome on the front surface of the A4 advertisement-printable medium.

After completing the processing in S244, S247, S250, or S253, the control unit of the MFP sets medium holding units to usable. In such instances, the A3 advertisement-printed medium holding unit, the A4 advertisement-printed medium holding unit, the A3 advertisement-printable medium holding unit, and the A4 advertisement-printable medium holding unit may be set to usable (S227) as illustrated in FIG. 17. Further, the on-demand advertisement-attached copy process may be terminated.

As illustrated in FIG. 13, after the control unit of the MFP terminates the on-demand advertisement-attached copy process in S188, the process returns to S181 again.

As described above, a plurality of kinds of A3 advertisement-printed media, on which different advertisements have been printed, are randomly arranged and held in the A3 advertisement-printed medium holding unit. In response to an instruction to perform advertisement-attached copying, the MFP performs copying using the plurality of kinds of A3 advertisement-printed media (S187 illustrated in FIG. 13). In some instances, the MFP performs copying if an instruction for copying satisfies specific conditions for printing on a plurality of recording media, namely, conditions related to "the scanner includ[ing] the automatic document feeder and [placing] at least one original document in the automatic document feeder" (YES in S185 and YES in S186 illustrated in FIG. 13). Thus, the MFP can effectively advertise.

Likewise, a plurality of kinds of A4 advertisement-printed media, on which different advertisements have been printed, are randomly arranged and held in the A4 advertisement-printed medium holding unit. In response to an instruction to perform advertisement-attached copying, the MFP copies using the plurality of kinds of A4 advertisement-printed media. In some instances, the MFP makes such copies if an instruction for copying satisfies specific conditions for printing on a plurality of recording media, namely, conditions related to "the scanner includ[ing] the automatic document feeder and [placing] at least one original document in the automatic document feeder". Thus, the MFP can effectively advertise.

Specifically, the MFP adopts, conditions related to "the scanner include[ing] the automatic document feeder and [placing] at least one original document in the automatic document feeder" for performing the advertisement-printed medium copy process. In some instances, the MFP may also adopt the advertisement-printed medium copy process and the on-demand advertisement-attached copy process. Also, a plurality of A3 advertisement-printed media, on which different advertisements have been printed, may be randomly arranged and held in the A3 advertisement-printed medium holding unit. These configurations allow the MFP to copy the different advertisements from the plurality of advertisement-printed media and print them on to at least one original document that is placed in the automatic document feeder.

Alternatively or in addition to the above conditions, the MFP can adopt other conditions for printing on a plurality of recording media, as conditions for performing the advertisement-printed medium copy process, among the advertisement-printed medium copy processes and the on-demand advertisement-attached copy processes.

In some instances, advertisement-attached copying may be performed on recording media. Further, the advertisement-printed medium copy process and the on-demand advertisement-attached copy process may be performed on the recording media. Yet, in some instances, advertisements printed on the surface of the recording media may be different from the surface on which copying is performed. Thus, the MFP can effectively advertise by printing larger advertisements.

(Second Embodiment)

The configuration of a network system according to a second embodiment of the present disclosure may be the same as the configuration of the network system. Thus, a detailed description thereof is omitted.

The operation of the network system may also be the same as the operation of the network system except for the operation to be described below.

Figure 19:
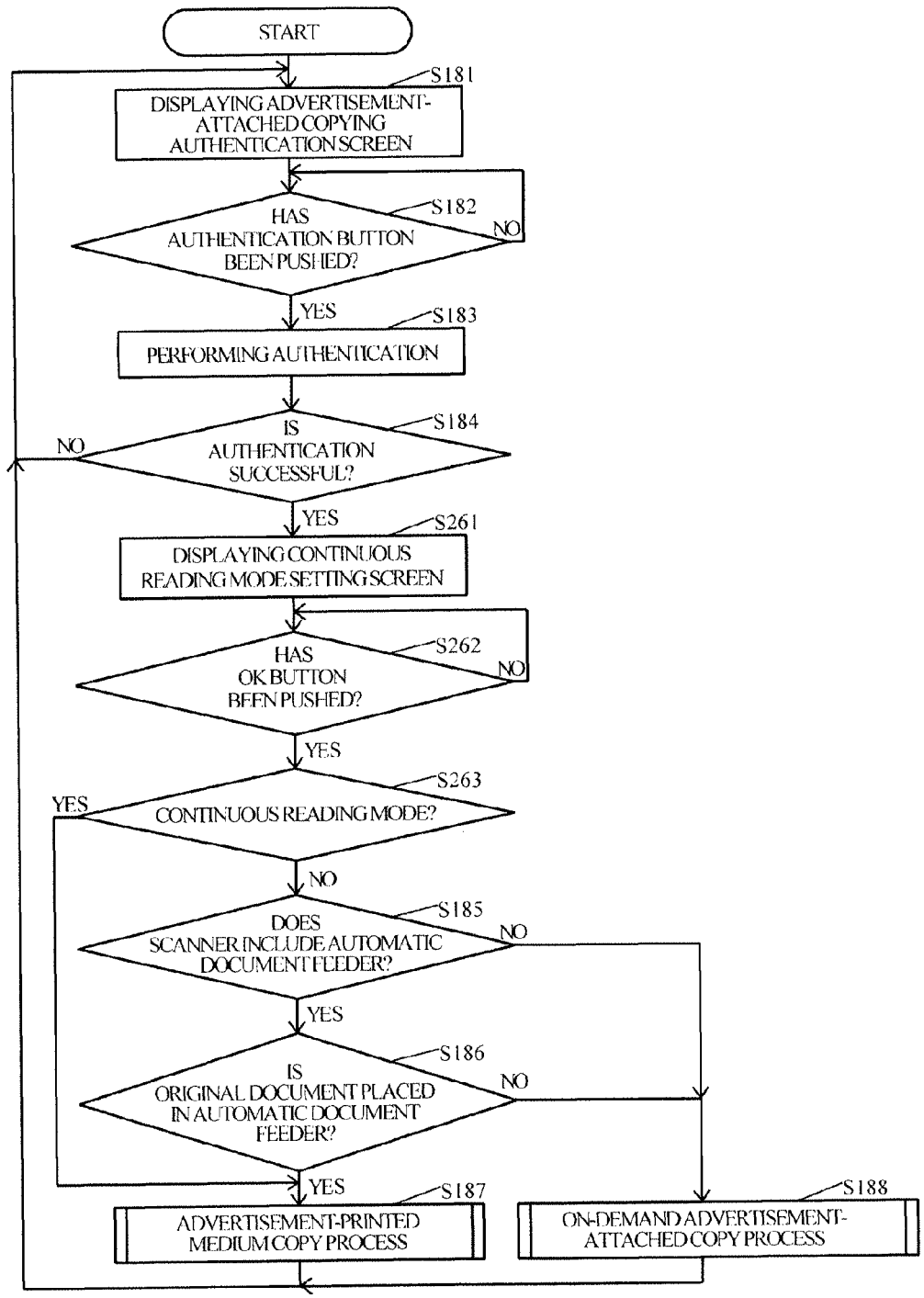
FIG. 19 illustrates an example flow of the operation for advertisement-attached copying, possibly performed by the control unit of the MFP included in a network system according to a second embodiment of the present disclosure.

FIG. 19 illustrates the flow of the operation for advertisement-attached copying performed by the control unit of the MFP included in the network system.

The operation illustrated in FIG. 19 may be the same as that illustrated in FIG. 13 except for the operation to be described below.

Figure 20:
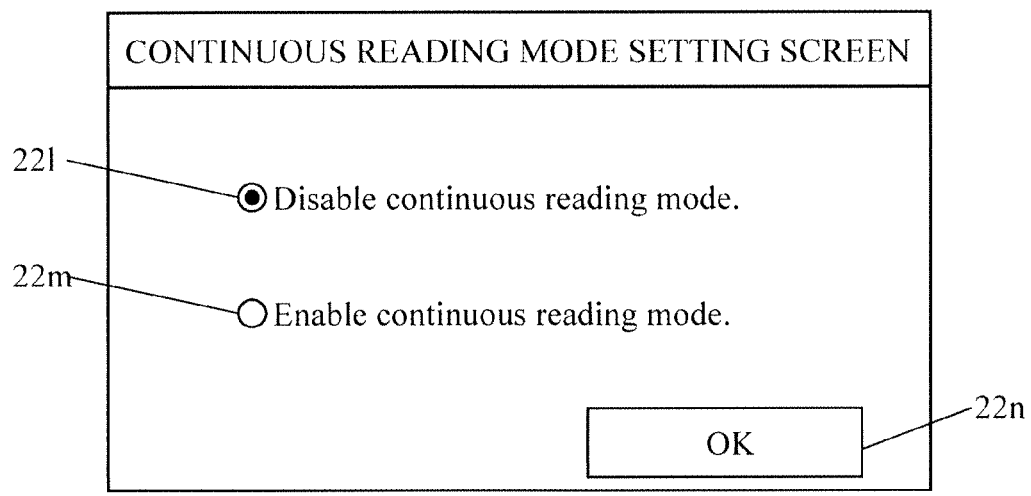
FIG. 20 illustrates an example of a continuous reading mode setting screen, possibly displayed on the display unit of the MFP according to the second embodiment of the present disclosure.

As illustrated in FIG. 19, if the extended authentication application of the control unit of the MFP included in the network system determines in S184 that authentication performed in S183 is successful, the extended authentication application displays a continuous reading mode setting screen illustrated in FIG. 20 on the display unit of the MFP (S261).

FIG. 20 illustrates the continuous reading mode setting screen displayed on the display unit of the MFP.

The continuous reading mode is a mode in which the scanner is manually caused to read plurality of original documents. As illustrated in FIG. 20, the continuous reading mode setting screen includes continuous reading mode disable radio button 22*l*, continuous reading mode enable radio button 22*m*, and OK button 22*n*. Continuous reading mode disable radio button 22*l* is a radio button with which an instruction to disable the continuous reading mode is given via the operation unit. The continuous reading mode enable radio button 22*m* is a radio button with which an instruction to enable the continuous reading mode is given via operation unit 21. The OK button is a button with which an instruction to decide the mode is given via the operation unit. Only one of continuous reading mode disable radio button 22*l* and continuous reading mode enable radio button 22*m* is selected.

As illustrated in FIG. 19, after performing the processing in S261, the extended authentication application determines whether or not the OK button has been pushed (S262).

Upon determining in S262 that the OK button has been pushed, the extended authentication application determines whether or not the current mode is the continuous reading mode (S263). If the continuous reading mode disable radio button is selected, the extended authentication application determines that the current mode is not the continuous reading mode. If the continuous reading mode enable radio button is selected, the extended authentication application determines that the current mode is the continuous reading mode.

After determining in S263 that the current mode is not the continuous reading mode, the extended authentication application then determines whether or not the scanner includes the automatic document feeder on the basis of a signal supplied from the scanner (S185).

On the other hand, if it is determined in S263 that the current mode is the continuous reading mode, the control unit of the MFP performs the advertisement-printed medium copy process illustrated in FIG. 15 (S187).

Figure 21:
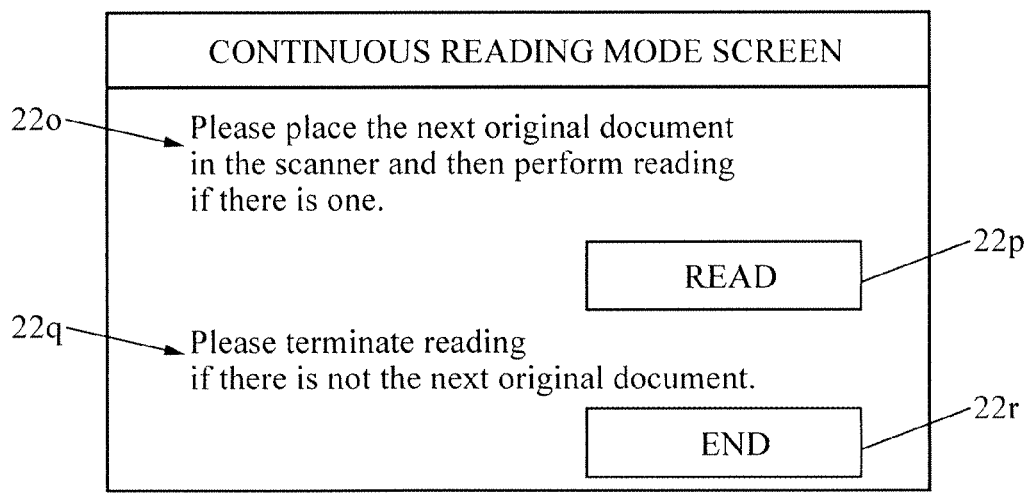
FIG. 21 illustrates a continuous reading mode screen, possibly displayed on the display unit of the MFP according to the second embodiment of the present disclosure.

If the current mode is the continuous reading mode, the control unit of the MFP displays a continuous reading mode screen illustrated in FIG. 21 on the display unit in S207, S210, S213, or S216 of the advertisement-printed medium copy process illustrated in FIG. 15.

FIG. 21 illustrates the continuous reading mode screen displayed on the display unit of the MFP.

As illustrated in FIG. 21, the continuous reading mode screen includes message 22*o*, read button 22*p*, message 22*q*, and end button 22*r*. Message 22*o* prompts the user to place the next original document in the scanner and then perform reading if there is one. Read button 22*p* is a button with which an instruction to perform reading is given via the operation unit. Message 22*q* prompts the user to terminate reading if there is not the next original document. End button 22*r* is a button with which an instruction to terminate reading is given via the operation unit.

In the continuous reading mode, the control unit of the MFP determines, in S207, S210, S213, or S216 illustrated in FIG. 15, that all the original documents have not been copied when read button 22*p* is pushed. In the continuous reading mode, the control unit of the MFP determines, in S207, S210, S213, or S216 illustrated in FIG. 15, that all the original documents have been copied when end button 22*r* illustrated in FIG. 21 is pushed.

As described above, a plurality of kinds of A3 advertisement-printed media, on which different advertisements have been printed, are randomly arranged and held in the A3 advertisement-printed medium holding unit. In response to an instruction to perform advertisement-attached copying, the MFP copies using the plurality of kinds of A3 advertisement-printed media (S187 illustrated in FIG. 19) if instructed copying satisfies specific conditions for printing on a plurality of recording media, namely, conditions "the current mode is the continuous reading mode" (YES in S263 illustrated in FIG. 19) or "the scanner includes the automatic document feeder and at least one original document is placed in the automatic document feeder" (YES in S185 and YES in S186 illustrated in FIG. 19). Thus, the MFP can effectively advertise.

Likewise, a plurality of kinds of A4 advertisement-printed media, on which different advertisements have been printed, are randomly arranged and held in the A4 advertisement-printed medium holding unit. In response to an instruction to perform advertisement-attached copying, the MFP may make copies using the plurality of different kinds of A4 advertisement-printed media. In some embodiments, the MFP may make such copies if instructions for copying satisfy specific conditions. In some instances, such conditions may be for printing on a plurality of recording media, namely, conditions such that "the current mode is the continuous reading mode". In some instances, these conditions may relate to "the scanner [which] includes the automatic document feeder and at least one original document is placed in the automatic document feeder". Thus, the MFP can effectively advertise.

Specifically, the MFP adopts the condition "the current mode is the continuous reading mode" as the condition for performing the advertisement-printed medium copy process among the advertisement-printed medium copy process and the on-demand advertisement-attached copy process. Accordingly, the MFP can copy using a plurality of kinds of advertisement-printed media on condition that the current mode is set in the continuous reading mode.

On recording media on which advertisement-attached copying, namely, the advertisement-printed medium copy process and the on-demand advertisement-attached copy process, has been performed, advertisements are printed on the surface of the recording media that is different from the surface on which copying is performed. Thus, the MFP can effectively advertise by printing larger advertisements.

Instead of or in addition to the above conditions, the MFP can adopt other conditions for printing on a plurality of recording media, as conditions for performing the advertisement-printed medium copy process, among the advertisement-printed medium copy process and the on-demand advertisement-attached copy process.

The MFP does not necessarily adopt condition such as "the scanner includes the automatic document feeder and at least one original document is placed in the automatic document feeder" as the condition for performing the advertisement-printed medium copy process, among the advertisement-printed medium copy process and the on-demand advertisement-attached copy process.

The present disclosure is not limited to the above embodiments and can be variously modified and altered within the scope that does not depart from the gist of the present disclosure.

For example, an image forming apparatus according to an embodiment of the present disclosure may be equipped with a coin acceptor so as to charge the user a fee for copying. When the image forming apparatus charges the user a fee for copying, a fee for advertisement-attached copying may be set to be lower than a fee for normal copying or may be free. Alternatively, when the image forming apparatus charges the user a fee for copying, different fees may be set for the advertisement-printed medium copy process and the on-demand advertisement-attached copy process. When the image forming apparatus charges the user a fee for copying, in the on-demand advertisement-attached copy process, a fee need not be charged for the back surface of recording media on which advertisements are printed.

In the on-demand advertisement-attached copy process, the image forming apparatus may print advertisements on the same surface of recording media as the surface on which copying is performed. Also, in the advertisement-printed medium copy process, the image forming apparatus may copy on the same surface of recording media as the surface on which advertisements have been printed.

This configuration allows the image forming apparatus according to perform double-sided printing during advertisement-attached copying.

The image forming apparatus according to the embodiment of the present disclosure may permit image processing, such as enlargement, reduction, and density adjustment, during advertisement-attached copying. The image forming apparatus may apply such image processing to the on-demand advertisement-attached copy process such that the image processing does not affect advertisements that are printed in the on-demand advertisement-attached copy process.

Every time the image forming apparatus performs the on-demand advertisement-attached copy process, it switches between kinds of advertisements to be printed in the on-demand advertisement-attached copy process in the box-ID order. The image forming apparatus may switches between kinds of advertisements to be printed in the on-demand advertisement-attached copy process by using a method other than the method described in the first embodiment. For example, the image forming apparatus may switch between kinds of advertisements to be printed in the on-demand advertisement-attached copy process depending on attributes, such as the age and gender of the authenticated user.

The image forming apparatus according to the embodiment of the present disclosure manages the box state information. Thus, at the time of activation, advertisement data may be written from the STB only in the box assigned the state "writing" in the box state information.

In the embodiments above, the STB updates the advertisement data stored in the boxes of the storage unit of the image forming apparatus when the image forming apparatus is activated and when the on-demand advertisement-attached copy process is completed. The STB may update the advertisement data at times other than the aforementioned ones. For example, the STB may update the advertisement data stored in the box of the storage unit of the image forming apparatus at a predetermined time and when an advertisement is distributed to the STB from the server.

The image forming apparatus according to the embodiment of the present disclosure may be a non-MFP image forming apparatus, such as a copier, as long as the apparatus is capable of performing advertisement-attached copying.

The image forming apparatus according the embodiment of the present disclosure may include three or more boxes. Also in this case, different box IDs are associated with individual boxes.

When performing the advertisement-attached copy process, the image forming apparatus according to the embodiment of the present disclosure may use a known authentication method, such as authentication using radio frequency identification (RFID) or biometrics authentication.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system comprising:
an image forming apparatus; and
a set top box,
wherein the image forming apparatus includes:
a printing device that prints on a recording medium;
a reading device that reads an image from an original document;
an advertisement-printed medium holding unit that holds an advertisement-printed medium;
an advertisement-printable medium holding unit that holds an advertisement-printable medium;
a first advertisement storage unit that stores an advertisement; and
a copy control unit that:
controls copying, wherein controlling copying enables the printing device to print the image on the recording medium; and
performs, in response to an instruction for advertisement-attached copying, one of the following:

i) advertisement-printable medium copying, wherein the advertisement is printed on the advertisement-printable medium, and ii) advertisement-printed medium copying, wherein the advertisement-printed medium is used if the instructions satisfy a specific condition for printing on a plurality of recording media, wherein the set top box includes:

a communication unit that receives a box ID and an advertisement data from a server;

a data control unit that generates a group of advertisements based on the advertisement data and stores the group of advertisements in an advertisement data folder in association with the received box ID; and a second advertisement storage unit that includes the advertisement data folder, wherein the data control unit writes the group of advertisements, in association with the box ID of the advertisement that has been printed in the advertisement-printable medium copying, to the first advertisement storage unit from the second advertisement storage unit.

2. The image forming system according to claim 1, wherein the advertisement-printed medium is the recording medium, and wherein the recording medium includes a first surface upon which the advertisement has been printed.

3. The image forming system according to claim 1, wherein:

the advertisement-printable medium is the recording medium, wherein the recording medium includes a first surface and a second surface;

the copying enables the printing device to print the image on the second surface; and the copy control unit causes the printing device to print the advertisement on the first surface.

4. The image forming system according to claim 1, wherein:

the reading device includes an automatic document feeder; and the specific condition includes a condition that the original document is placed in the automatic document feeder.

5. The image forming system according to claim 1, wherein the specific condition includes a current mode in which the reading device reads a plurality of original documents one by one.

6. A non-transitory computer-readable recording medium storing a copy control program to be executed by a first computer included in an image forming apparatus and a second computer included in a set top box, the copy control program comprising:

a first program code that causes the first computer to print, in an image forming apparatus, on a recording medium;

a second program code that causes the first computer to read, in an image forming apparatus, an image from an original document;

a third program code that causes the first computer to store an advertisement in a first advertisement storage unit of the image forming apparatus;

a fourth program code that causes the first computer to control, in the image forming apparatus, copying for printing the image on the recording medium;

a fifth program code that causes the first computer to perform, in the image forming apparatus, in response to an instruction for advertisement-attached copying, one of the following:

i) advertisement-printable medium copying, wherein the advertisement is printed on an advertisement-printable medium, and ii) advertisement-printed medium copying, wherein an advertisement-printed medium is used if the instructed copying satisfies a specific condition for printing on a plurality of recording media;

a sixth program code that causes the second computer to receive, in a set top box, a box ID and an advertisement data from a server;

a seventh program code that causes the second computer to generate, in the set top box, a group of advertisements based on the advertisement data;

a eighth program code that causes the second computer to store in the set top box, the group of advertisements in an advertisement data folder of a second advertisement storage unit in association with the received box ID; and a ninth program code that causes the second computer to write in the set top box, the group of advertisements, in association with the box ID of the advertisement that has been printed in the advertisement-printable medium copying, to the first advertisement storage unit from the second advertisement storage unit.

7. The non-transitory computer-readable recording medium according to claim 6, wherein the advertisement-printed medium is the recording medium, and wherein the recording medium includes a first surface on which the advertisement has been printed.

8. The non-transitory computer-readable recording medium according to claim 6, wherein: the advertisement-printable medium is the recording medium, wherein the recording medium includes a first surface and a second surface, the fourth program code causes the first computer to print the image on the second surface, and the fifth program code causes the first computer to print the advertisement on the first surface.

9. The non-transitory computer-readable recording medium according to claim 6, wherein: the second program code causes the first computer to read, by using an automatic document feeder, the image from the original document, and the specific condition is that the original document is placed in the automatic document feeder.

10. The non-transitory computer-readable recording medium according to claim 6, wherein the second program code causes the first computer to read, by using a reading device, the image from the original document, and wherein the specific condition includes a condition that the current mode is a mode in which the reading device is manually caused to read the original documents one by one.

11. A copy control method, comprising:

printing, via a printing device of an image forming apparatus, on a recording medium;

reading, via a reading device of the image forming apparatus, an image from an original document;

storing, via an first advertisement storage unit of the image forming apparatus, an advertisement;

controlling, via a copy control unit of the image forming apparatus, copying to enable the printing device to print the image on the recording medium;

performing, via the copy control unit of the image forming apparatus, in response to an instruction for advertisement-attached copying, one of the following:

i) advertisement-printable medium copying, wherein the advertisement is printed on an advertisement-printable medium, and ii) advertisement-printed medium copying, wherein an advertisement-printed medium is used if the instructed copying satisfies a specific condition for printing on a plurality of recording media;

receiving, via a communication unit of a set top box, a box ID and an advertisement data from a server;

generating, via a data control unit of the set top box, a group of advertisements based on the advertisement data; and storing, via the data control unit of the set top box, the group of advertisements in an advertisement data folder of a second advertisement unit of the set top box in association with the received box ID; and writing, via the data control unit of the set top box, the group of advertisements, in association with the box ID of the advertisement that has been printed in the advertisement-printable medium copying, to the first advertisement storage unit from the second advertisement storage unit.

12. The copy control method according to claim 11, wherein the advertisement-printed medium is the recording medium, and wherein the recording medium includes a first surface on which the advertisement has been printed in advance.

13. The copy control method according to claim 11, wherein:

the advertisement-printable medium is the recording medium, wherein the recording medium includes a first surface and a second surface;

the copy control unit controls the copying so that the printing device prints the image on the second surface; and the copy control unit prints the advertisement on the first surface.

14. The copy control method according to claim 11, wherein:

the reading device reads, by using an automatic document feeder, the image from the original document; and the specific condition includes a condition that the original document is placed in the automatic document feeder.

15. The copy control method according to claim 11, wherein the specific condition includes a current mode in which the reading device is manually caused to read the original documents one by one.

16. The image forming system according to claim 1, wherein the group includes the advertisements having different size or colors.

17. The image forming system according to claim 1, wherein the copy control unit switches the advertisement to be printed in the box ID order after the advertisement-printable medium copying.

* * * * *